(12) United States Patent
Grube et al.

(10) Patent No.: US 10,102,063 B2
(45) Date of Patent: Oct. 16, 2018

(54) TRANSFERRING DATA UTILIZING A TRANSFER TOKEN MODULE

(75) Inventors: Gary W. Grube, Barrington Hills, IL (US); Timothy W. Markison, Mesa, AZ (US); Greg Dhuse, Chicago, IL (US); Jason K. Resch, Chicago, IL (US); Ilya Volvovski, Chicago, IL (US); Wesley Leggette, Oak Park, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1033 days.

(21) Appl. No.: 13/372,628

(22) Filed: Feb. 14, 2012

(65) Prior Publication Data

US 2012/0226772 A1 Sep. 6, 2012

Related U.S. Application Data

(60) Provisional application No. 61/448,518, filed on Mar. 2, 2011.

(51) Int. Cl.
*G06F 15/16* (2006.01)
*G06F 11/10* (2006.01)
(Continued)

(52) U.S. Cl.
CPC .......... *G06F 11/1076* (2013.01); *G06F 3/067* (2013.01); *G06F 11/1004* (2013.01);
(Continued)

(58) Field of Classification Search
CPC . H04L 67/1097; H04L 63/0428; G06F 3/067; G06F 11/1004
(Continued)

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

(Continued)

*Primary Examiner* — Richard G Keehn
(74) *Attorney, Agent, or Firm* — Garlick & Markison; Timothy W. Markison; Randy W. Lacasse

(57) ABSTRACT

A method for data transfer from a first computing device to a second computing device begins when the first computing device is paired with a transfer token module by the first computing device sending the data to the transfer token module. The method continues with the transfer token module encoding the data utilizing a dispersed storage error encoding function to produce a set of encoded data slices and sending the set of encoded data slices to a target destination. The method continues, when the second computing device is paired with the transfer token module, with the transfer token module retrieving the set of encoded data slices from the target destination and decoding the set of encoded data slices utilizing the dispersed storage error encoding function to recapture the data. The method continues with the second computing device storing the data.

29 Claims, 19 Drawing Sheets

(51) Int. Cl.
 *H04L 29/06* (2006.01)
 *G06F 3/06* (2006.01)
 *H04L 29/08* (2006.01)
 *G06F 11/14* (2006.01)

(52) U.S. Cl.
 CPC ...... *G06F 11/1008* (2013.01); *H04L 63/0428* (2013.01); *H04L 67/1097* (2013.01); *G06F 11/1448* (2013.01)

(58) Field of Classification Search
 USPC .......................................................... 709/217
 See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 5/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0191990 | A1* | 9/2005 | Willey .................. H04L 63/062 455/411 |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0283167 | A1 | 6/2007 | Venters, III et al. |
| 2007/0174192 | A1 | 7/2007 | Gladwin et al. |
| 2007/0186105 | A1* | 8/2007 | Bailey ................ H04L 63/0492 713/168 |
| 2007/0214285 | A1* | 9/2007 | Au et al. ........................ 709/246 |
| 2007/0234110 | A1 | 10/2007 | Soran et al. |
| 2008/0227393 | A1* | 9/2008 | Tang ..................... H04W 8/005 455/41.3 |
| 2008/0253448 | A1* | 10/2008 | Lin et al. ................. 375/240.03 |
| 2008/0267287 | A1* | 10/2008 | Hannuksela ............. 375/240.12 |
| 2009/0094251 | A1 | 4/2009 | Gladwin et al. |
| 2009/0094318 | A1 | 4/2009 | Gladwin et al. |
| 2009/0154559 | A1* | 6/2009 | Gardner ............ H04N 21/2381 375/240.14 |
| 2010/0023524 | A1* | 1/2010 | Gladwin et al. ................ 707/10 |
| 2011/0029711 | A1* | 2/2011 | Dhuse .................. G06F 11/1076 711/4 |
| 2011/0029809 | A1* | 2/2011 | Dhuse .................. G06F 11/1076 714/6.1 |
| 2011/0225417 | A1* | 9/2011 | Maharajh et al. ............ 713/150 |
| 2013/0046973 | A1* | 2/2013 | Resch et al. .................. 713/156 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

(56) References Cited

OTHER PUBLICATIONS

Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.

* cited by examiner computing system 10

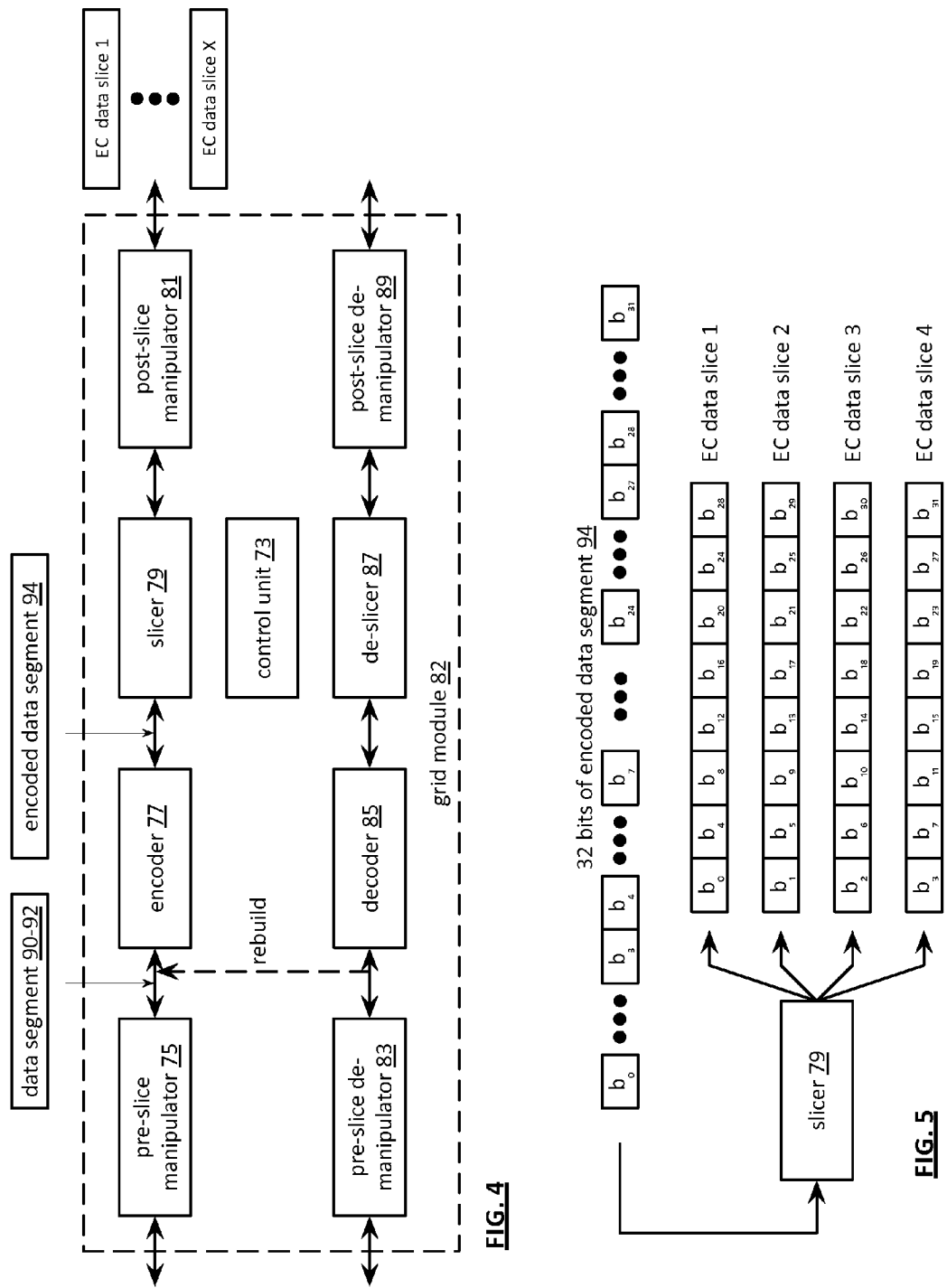

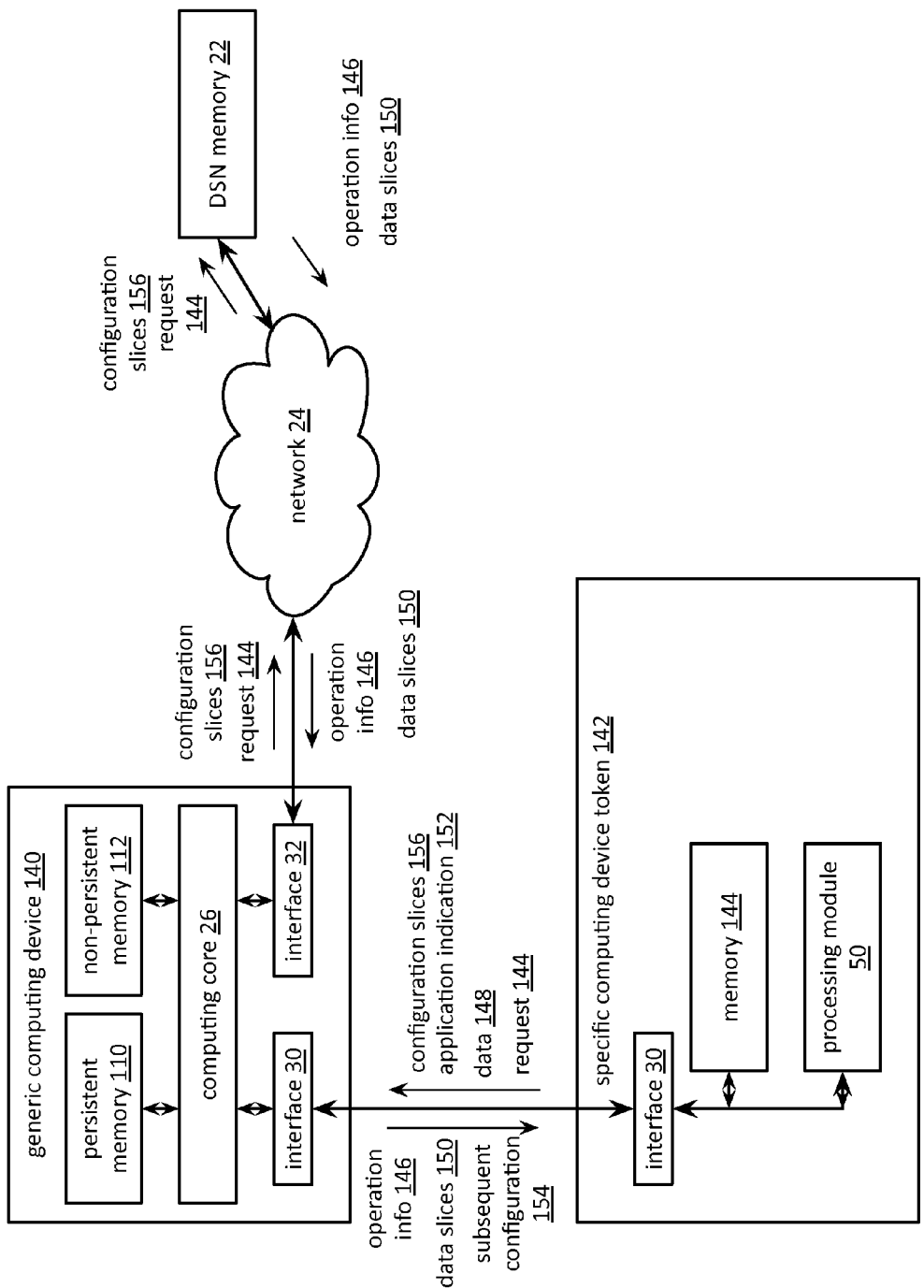

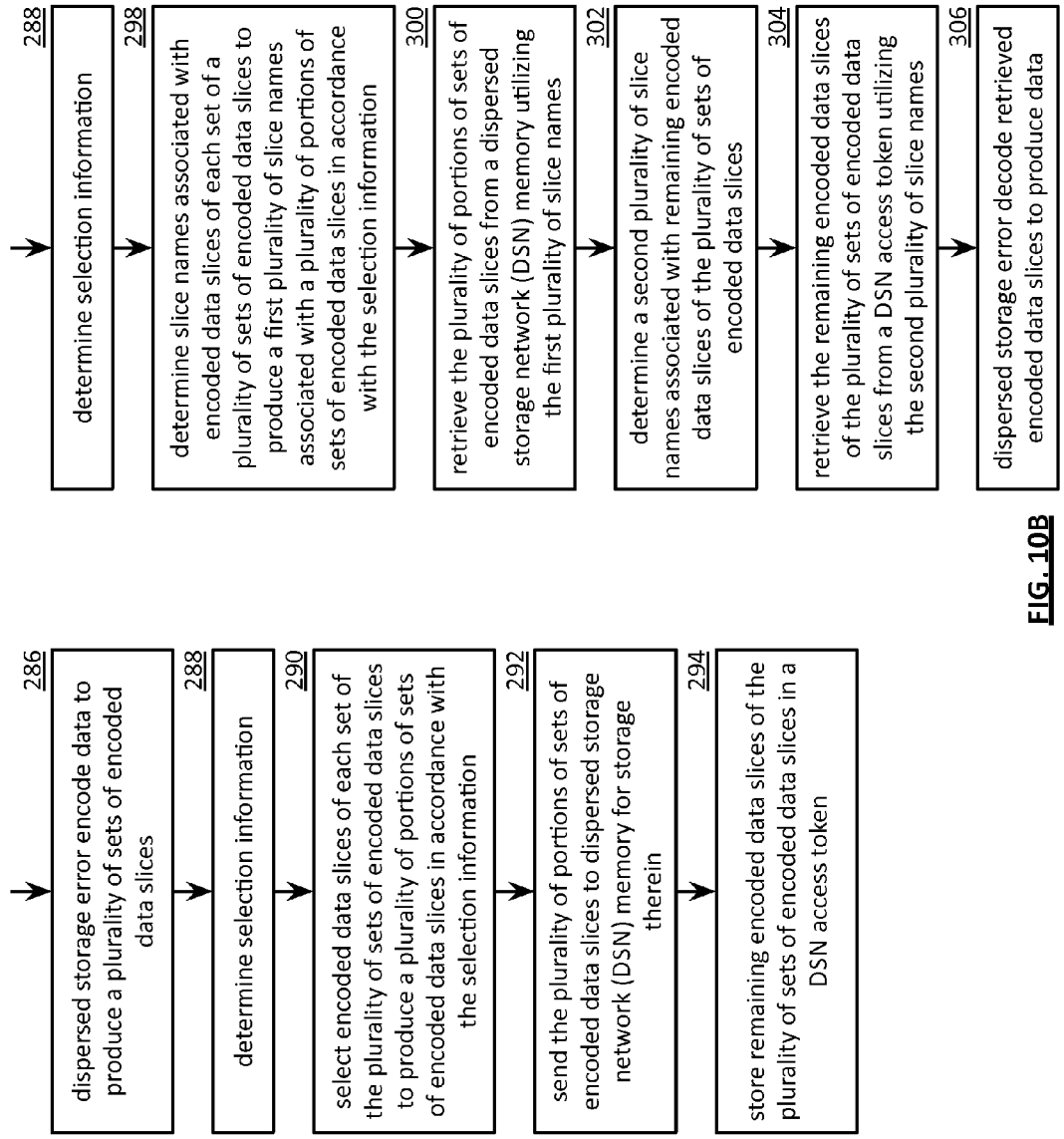

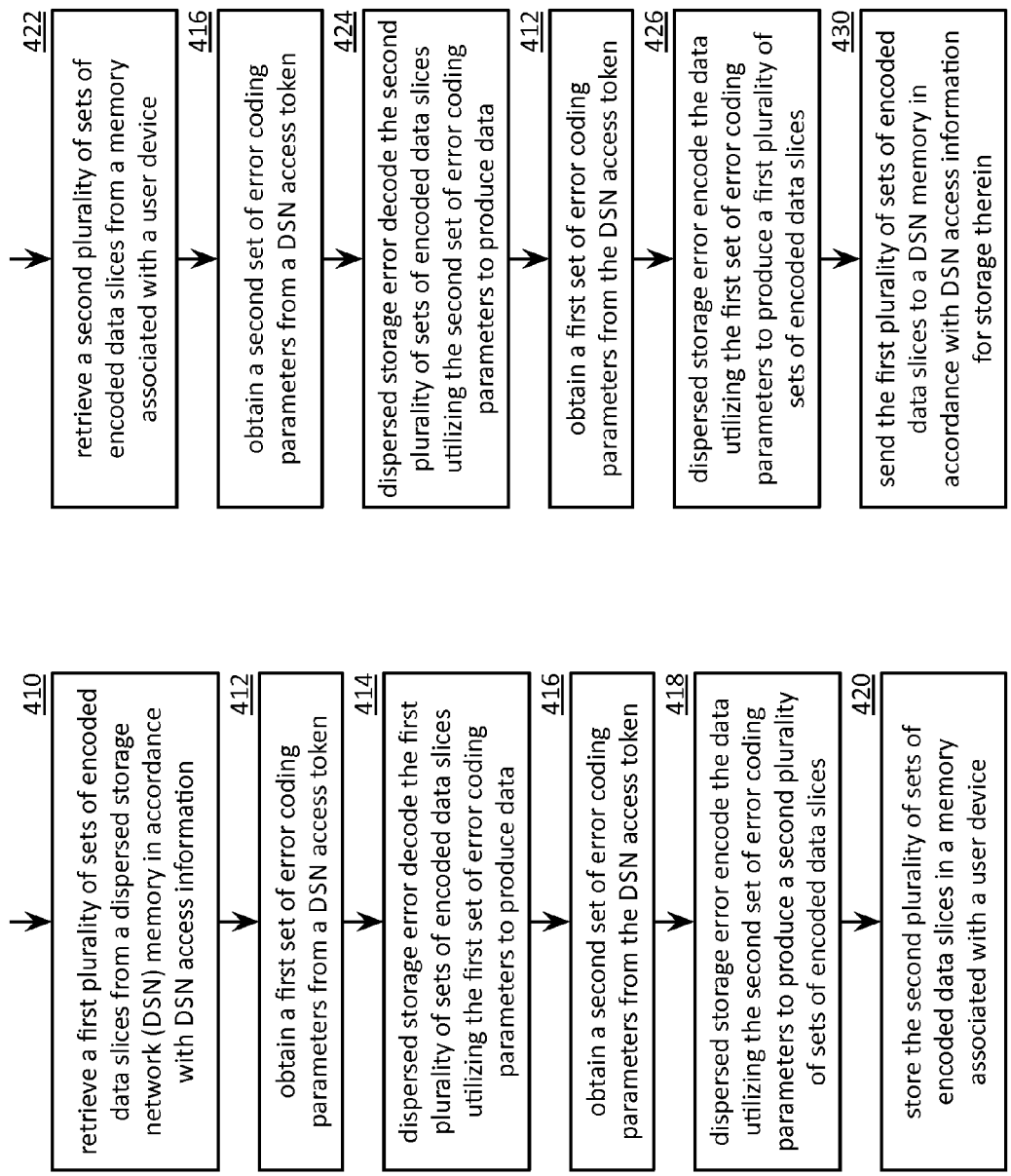

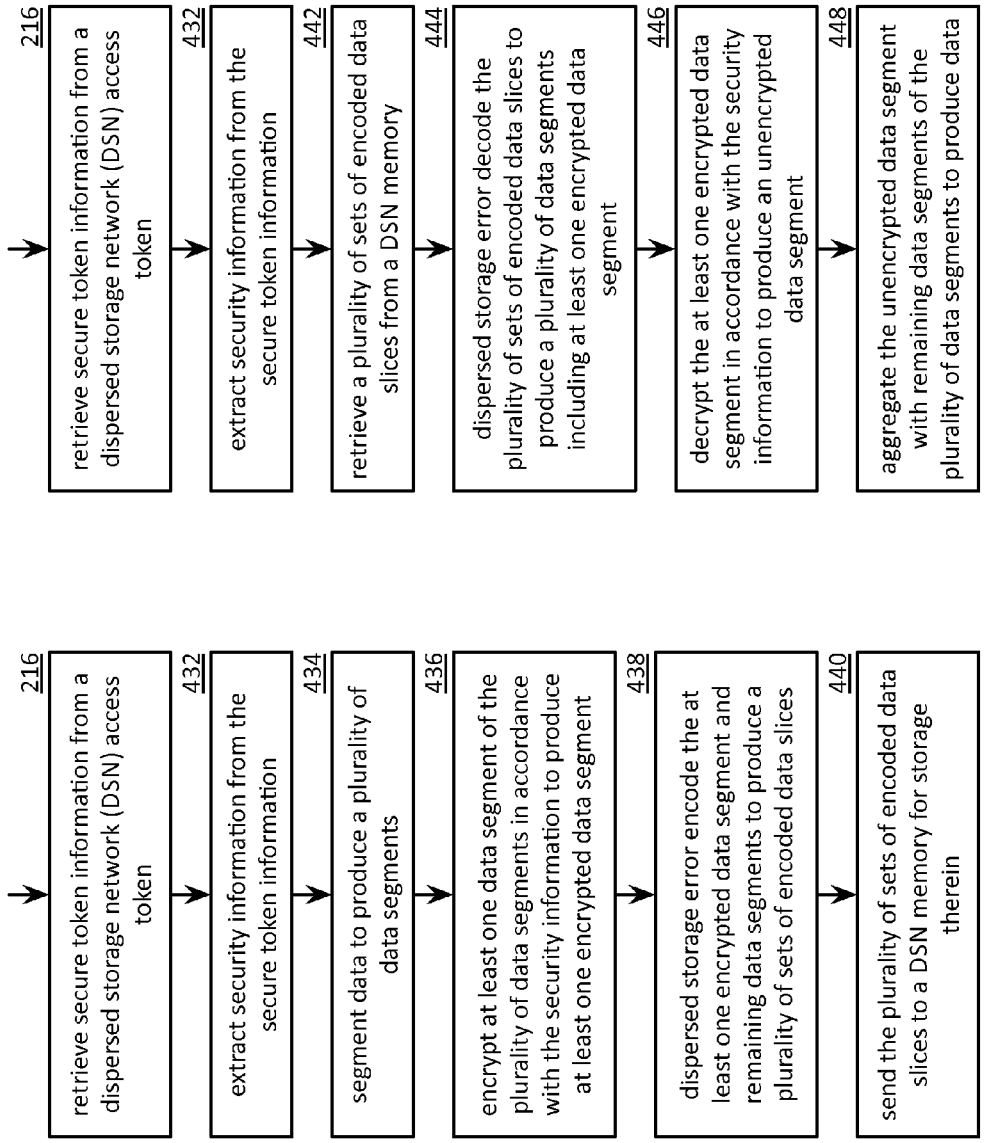

TRANSFERRING DATA UTILIZING A TRANSFER TOKEN MODULE

CROSS REFERENCE TO RELATED PATENTS

The present U.S. Utility Patent Application is claiming priority pursuant to 35 U.S.C. § 119(e) to U.S. Provisional Application No. 61/448,518, entitled "Dispersed Storage Network Access Utilizing an Access Token," filed Mar. 2, 2011, pending, which is incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the present invention;

FIG. 5 is a diagram of an example embodiment of error coded data slice creation in accordance with the present invention;

FIG. 7A is a schematic block diagram of another embodiment of a computing system in accordance with the present invention;

FIG. 10A is a flowchart illustrating an example of storing data in accordance with the present invention;

FIG. 10B is a flowchart illustrating an example of retrieving data in accordance with the present invention;

FIG. 11C is a flowchart illustrating another example of transferring data in accordance with the present invention;

FIG. 11D is a flowchart illustrating another example of transferring data in accordance with the present invention;

FIG. 12A is a flowchart illustrating another example of storing data in accordance with the present invention;

FIG. 12B is a flowchart illustrating another example of retrieving data in accordance with the present invention.

DETAILED DESCRIPTION OF THE INVENTION

Figure 1:
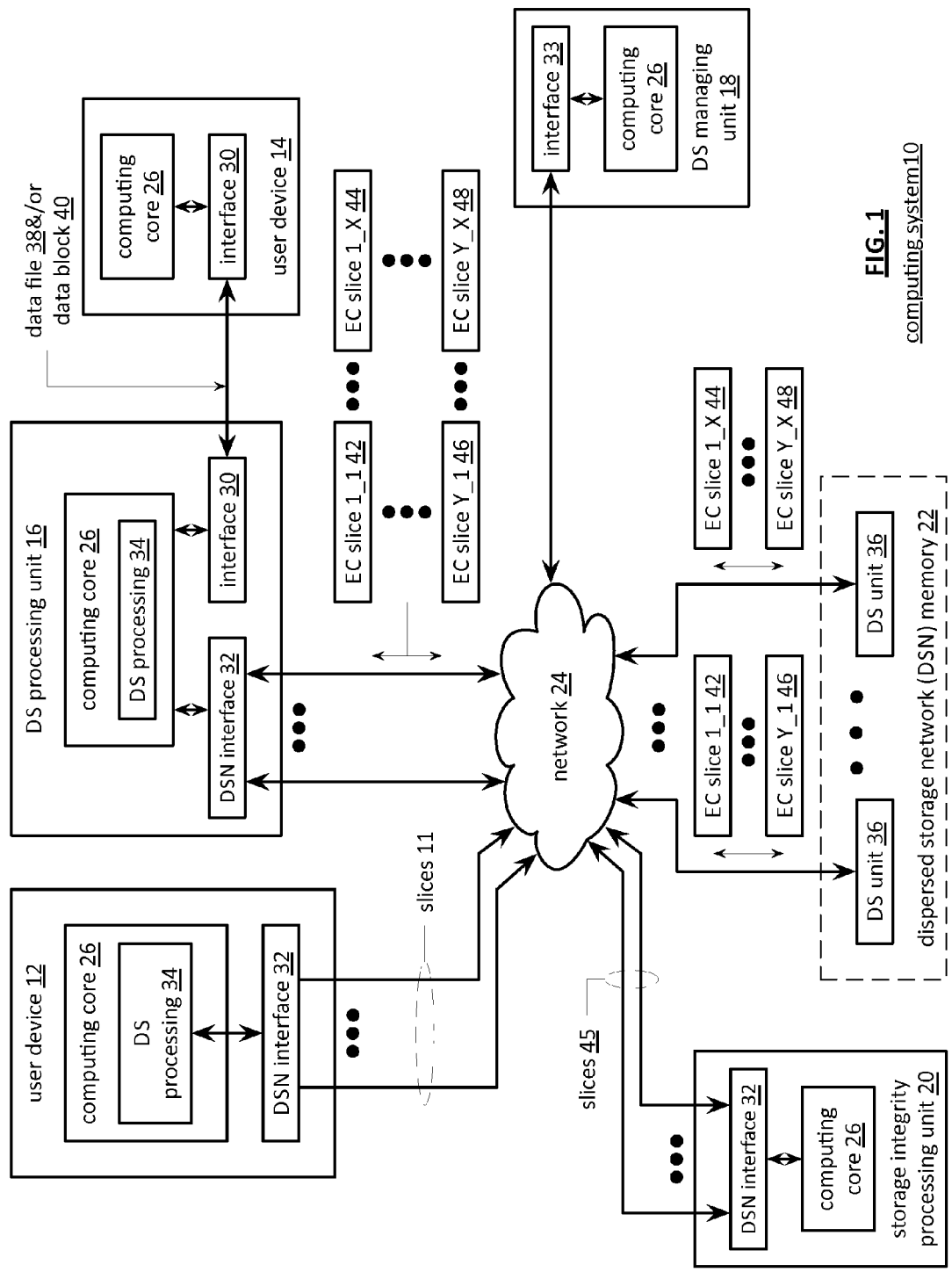
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
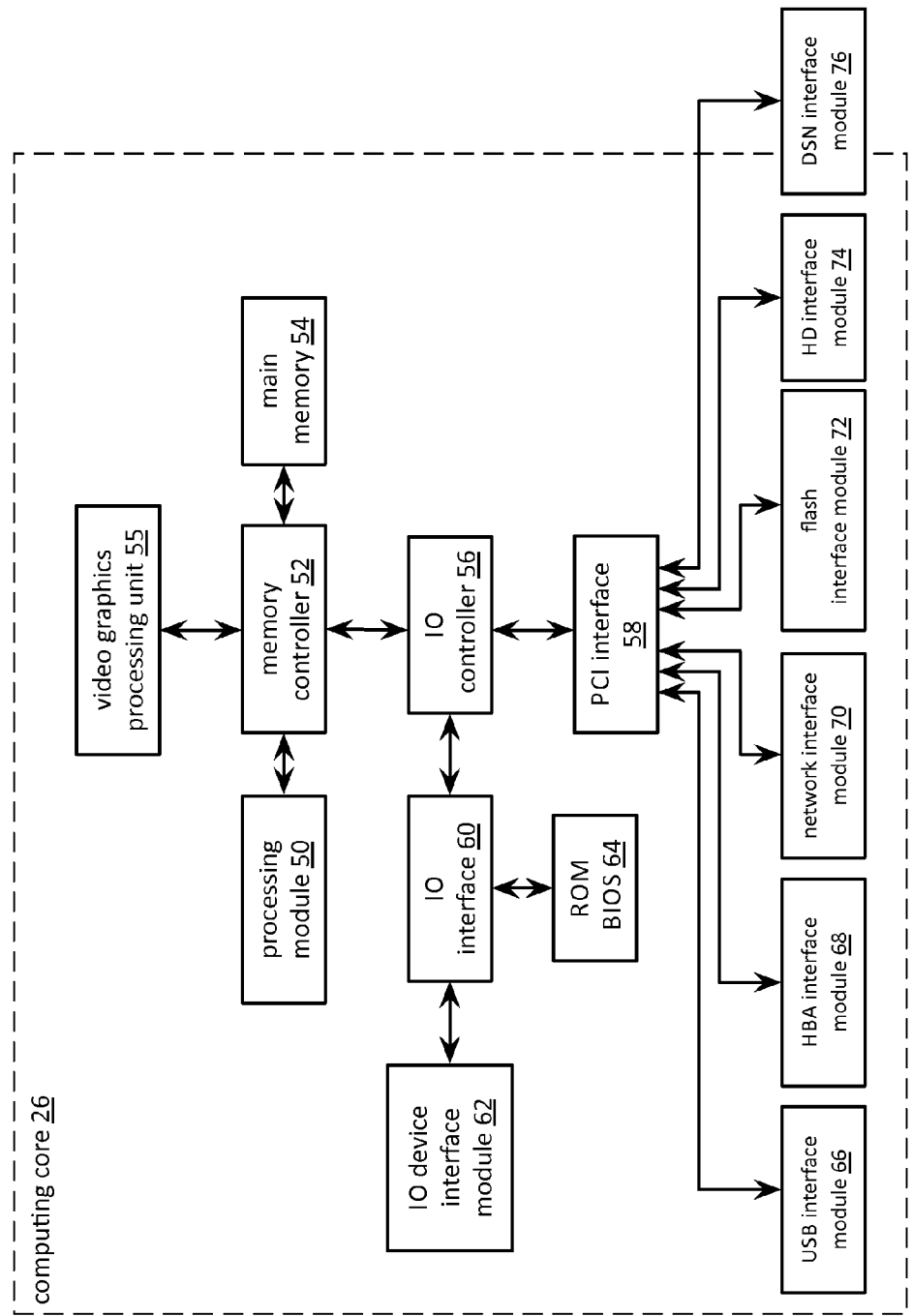
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
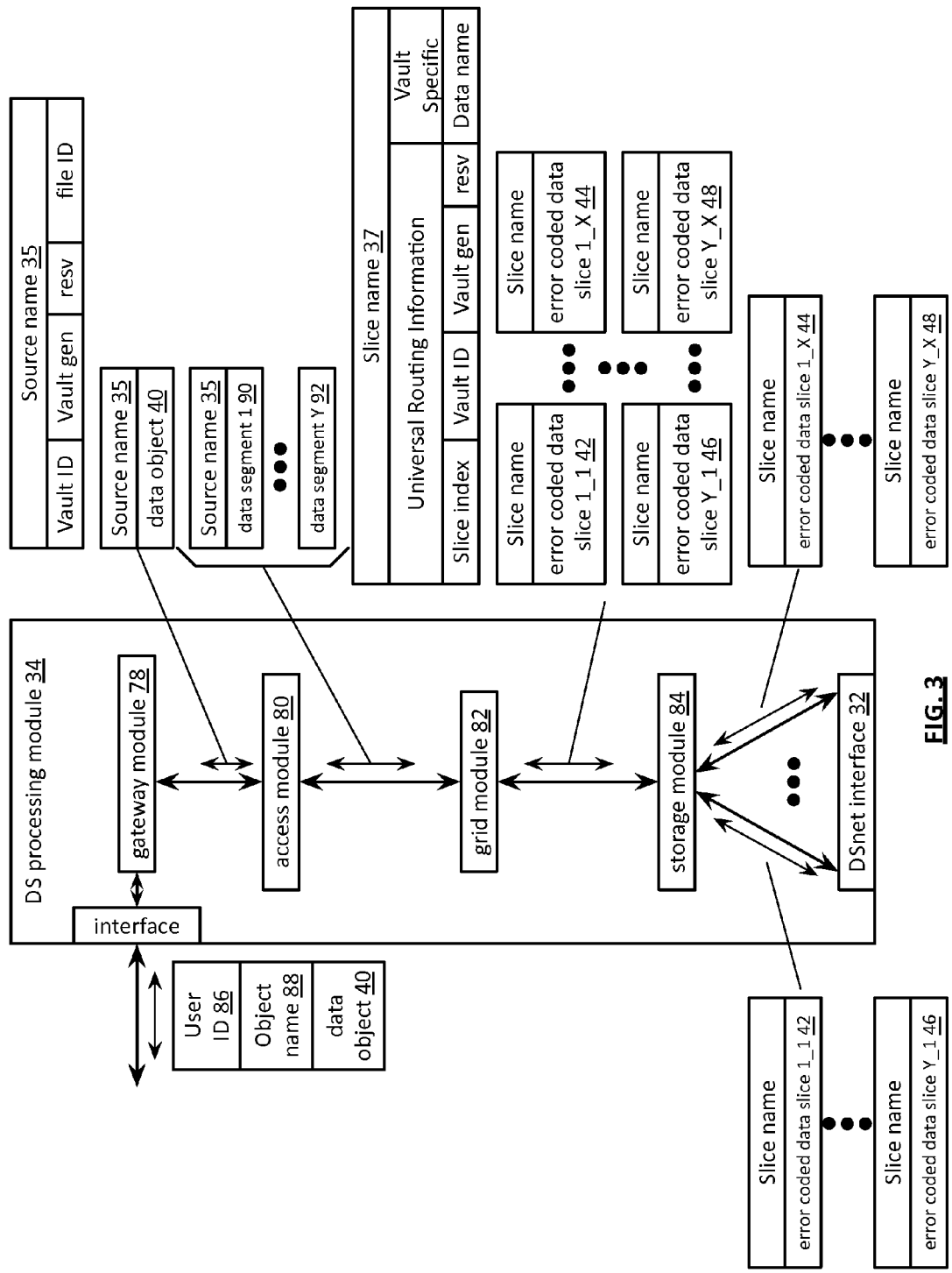
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
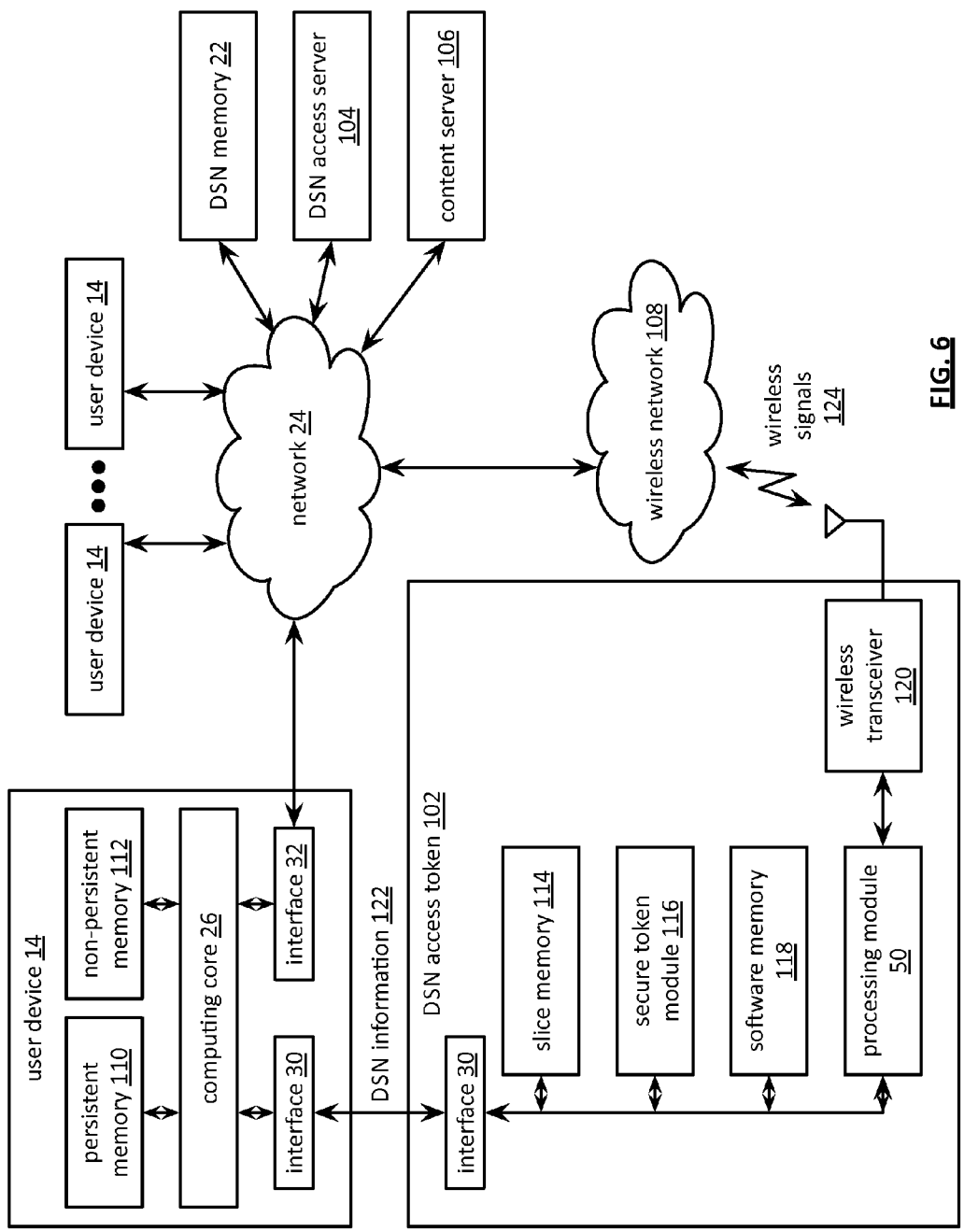
FIG. 6 is a schematic block diagram of another embodiment of a computing system in accordance with the present invention.

FIG. 6 is a schematic block diagram of another embodiment of a computing system that includes a plurality of user devices 14, a network 24, a dispersed storage network (DSN) memory 22, a DSN access server 104, a content server 106, a wireless network 108, and a DSN access token module 102. The user device includes an interface 30, an interface 32, a computing core 26, a persistent memory 110, and a non-persistent memory 112. The persistent memory 110 includes a memory type such that data persists when the persistent memory 110 receives no power (e.g., a disk drive, flash memory). The non-persistent memory 112 includes a memory type such that data does not persist when the non-persistent memory does not receive power (e.g., random access memory (RAM)).

In an embodiment, the DSN access token module 102 includes an interface 30, a slice memory 114, a secure token module 116, a software memory 118, a processing module 50, and a wireless transceiver 120. The slice memory 114 includes memory to store one or more of encoded data slices, slice names, slice integrity information, and slice location information. The secure token module 116 includes memory and/or memory and an associated processing module utilized to store and retrieve secure token information. The secure token module 116 provides access to the secure token information via one or more of a retrieval utilizing a secure token information address, receiving a read request message that includes the secure token information address, and receiving a read request message that includes the secure token information address and a secure token access credential. The secure token information includes one or more of access credentials, encryption algorithm information, a private key, a public key, a shared key, DSN addressing information, a vault identifier (ID), a user ID, storage payment information, storage payment plan information, storage credits, a DSN provider list, a location of dispersed storage (DS) processing software, dispersed storage error coding parameters, a storage payment alert, DSN access information, DS processing software redistribution information, encoded data slice storage rights, and data storage rights. The DSN access information includes one or more of the DSN addressing information, a DSN access credential, and the user ID.

The software memory 118 includes memory to store one or more of DS processing software, boot software, operating system (OS) software, application software, protocol conversion software, network access software, server access software, wireless network access software, and interface driver software. The wireless transceiver 120 includes a wireless transmitter and receiver pair and converts information into wireless signals 124 and converts the wireless signals 124 into information. The wireless transceiver 120 communicates the wireless signals 124 with the wireless network 108 and may operate in accordance with one or more wireless industry standards including universal mobile telecommunications system (UMTS), global system for mobile communications (GSM), long term evolution (LTE), wideband code division multiplexing (WCDMA), IEEE 802.11, IEEE 802.16, WiMax, Bluetooth, or any other LAN, WAN, PAN or like wireless protocol.

The DSN access server 104 provides storage for one or more of DS processing software, an access control list (ACL), and access credentials. The content server 106 provides storage for one or more of digital music content, digital book content, digital video content, and any other type of multimedia content.

In an implementation embodiment, the DSN access token module 102 resembles an external memory device (e.g., a FLASH drive), wherein the interface 30 operates in accordance with an industry universal serial bus protocol (USB) standard. For example, the DSN access token module 102 is coupled to the user device 14 such that DSN information 122 may be transferred back and forth between the user device 14 and the DSN access token module 102 utilizing interface 30 of the DSN access token 102 and interface 30 of the user device 14. The DSN information 122 may be utilized to facilitate access to the DSN memory 22 and/or the content server 106 by the user device 14. For example, the user device 14 acquires secure token information as the DSN information 122 from the DSN access token module 102 and utilizes the secure token information to access the DSN memory 22.

As another example, the user device 14 acquires the secure token information from the DSN access token module 102, acquires DS processing software from the DSN access token module 102, dispersed storage error encodes data to produce encoded data slices for storage utilizing the DS processing software, and utilizes the secure token information to store the encoded data slices in the DSN memory 22. As yet another example, the user device 14 sends data for storage to the DSN access token module 102 and the DSN access token module 102 dispersed storage error encodes the data to produce a plurality of sets of encoded data slices. Next, the DSN access token module 102 sends DSN access information 122 (e.g., a DSN address, an access credential) and the plurality of sets of encoded data slices to the user device 14. The user device 14 sends the plurality of sets of encoded data slices to the DSN memory 22 utilizing the DSN access information 122 for storage therein. The method of operation is discussed in greater detail with reference to FIGS. 7-13.

Alternatively, the DSN access token module 102 is implemented as a software module. For example, the DSN access token module 102 is implemented in the user device 14. As another example, the DSN access token module 102 is implemented in the DSN access server 104.

FIG. 7A is a schematic block diagram of another embodiment of a computing system that includes a generic computing device 140 (e.g., a user device 14), a network 24, a dispersed storage network (DSN) memory 22, and a specific computing device token 142. The generic computing device 140 includes a computing core 26, an interface 30, an interface 32, and memory 110-112 (e.g., persistent memory 110, non-persistent memory 112). The specific computing device token 142 includes an interface module 30 for interfacing with the generic computing device 140, a memory 144, and a processing module 50 operably coupled to the memory 144. The interface module 30 includes at least one of a universal serial bus (USB) interface module, a Bluetooth interface module, a fire-wire interface module, a 60 GHz wireless transceiver, and a Wi-Fi interface module.

The processing module 50 is operable to establish a pairing between the generic computing device 140 and the specific computing device token 142 by detecting a coupling of the specific computing device token 142 to the generic computing device 140 (e.g., the coupling includes a direct physical connection such as a universal serial bus (USB) interface connection, a functional connection via the network 24), receiving user activation information from the generic computing device, authenticating the user activation information, when the user activation information is authenticated, establishing the pairing. The user activation information includes one or more of an active indicator, an identifier (ID) of the generic computing device 140, a password, a user ID, a signature, a public key, a credential, a vault identifier, a user identifier, an access code, a timestamp associated with a previous specific computing device operation information, and an identifier for operation information of the specific computing device 142. The authenticating includes indicating authenticated when a user ID and a password compare favorably to authentication information of the operation information of the specific computing device 142. The establishing the pairing includes sending a pairing request to the generic computing device 140 and establishing a pairing state as paired.

When the generic computing device 140 is paired with the specific computing device token 142, the processing module 50 is further operable to send a distributed storage network (DSN) access request 144 to DSN memory 22 via the generic computing device 140, wherein the DSN access request 144 identifies specific computing device operation information 146 that is stored as one or more of sets of encoded data slices in the DSN memory 22 and wherein the specific computing device operation information 146 was encoded using a dispersed storage error encoding function to produce the plurality of sets of encoded data slices (e.g., alternatively, the specific computing device token 142 sends the request directly to the DSN memory 22), receive the one or more of sets of encoded data slices from the DSN memory 22 via the generic computing device 140 (e.g., alternatively, the specific computing device token 142 receives the slices directly from the DSN memory 22), decode the one or more of sets of encoded data slices to retrieve the specific computing device operation information 146, and enable the generic computing device 140 to function as a specific computing device in accordance with the specific computing device operation information 146.

The specific computing device operation information 146 includes one or more of operating system information (e.g., an operating system, a portion of the operating system, an operating system identifier), software application information (e.g., a software application, a portion of the software application, a software application identifier, configuration information of the software application), file information (e.g., a data file, a portion of the data file, a data file identifier, an active pointer of the data file), a machine state indicator, a machine pointer value, a machine register value, a machine stack value set, a next machine instruction ID, a data register data, a signature, a key, virtual memory configuration information (e.g., an amount of virtual memory, an assignment for the virtual memory), and computing device hardware configuration information (e.g., a port identifier, a communication speed, a configuration protocol identifier, etc.).

The processing module 50 functions to enable the generic computing device 140 by one or more of retrieving a plurality of sets of encoded data slices 150 from the DSN memory 22 via the generic computing device 140 (e.g., or directly), wherein the plurality of sets of encoded data slices 150 is a dispersed storage error encoded representation of data 148 and wherein the data 148 includes one or more of at least a portion of a user application, at least a portion of a system level application, at least a portion of a file, and at least a portion of a file directory; decoding the plurality of sets of encoded data slices 150 to recapture the data 148, and sending the data 148 to the generic computing device 140 to facilitate processing, by the generic computing device 140 as the specific computing device, the data 148.

The processing module 50 further functions to enable the generic computing device 140 by one or more of providing an indication of an application 152 to be executed by the generic computing device 140 (e.g., alternatively, may also include an indication of an operating system to be utilized), retrieving a plurality of sets of encoded data slices 150 from the DSN memory 22 via the generic computing device 140, wherein the plurality of sets of encoded data slices 150 is a dispersed storage error encoded representation of at least a portion of a file; decoding the plurality of sets of encoded data slices 150 to recapture data of the at least a portion of the file, and configuring the generic computing device 140 to function as the specific computing device, which executes the indicated application on the data. For example, the specific computing device token 142 sends the data, the file, the indicated application, and the indication of the application 152 to the generic computing device 140.

The processing module 50 further is further operable to detect an end of session between the generic computing device and the specific computing device token, and when the end of session is detected, receive a subsequent configuration 154 of the generic computing device 140 functioning as the specific computing device to produce subsequent configuration information, encode the subsequent configuration information using the dispersed storage error encoding function to produce one or more sets of encoded configuration slices 156, send (e.g., via the generic computing device 140 or direct) the one or more sets of encoded configuration slices 156 to the DSN memory 22 for storage therein. The detecting the end of session includes at least one of detecting a broken coupling between the generic computing device on a specific computing device token and receiving an end of session request. The subsequent configuration information includes at least one of an active software application identifier (ID), a current machine state indicator, a current machine pointer value, a current machine register value, a next machine instruction ID, a current data register data, a signature, a key, virtual memory configuration information, and computing device hardware configuration information. The sending the one or more sets of encoded configuration slices to the DSN memory 22 includes storing a source name of the subsequent configuration information in the specific computing device token 142.

Figure 7B:
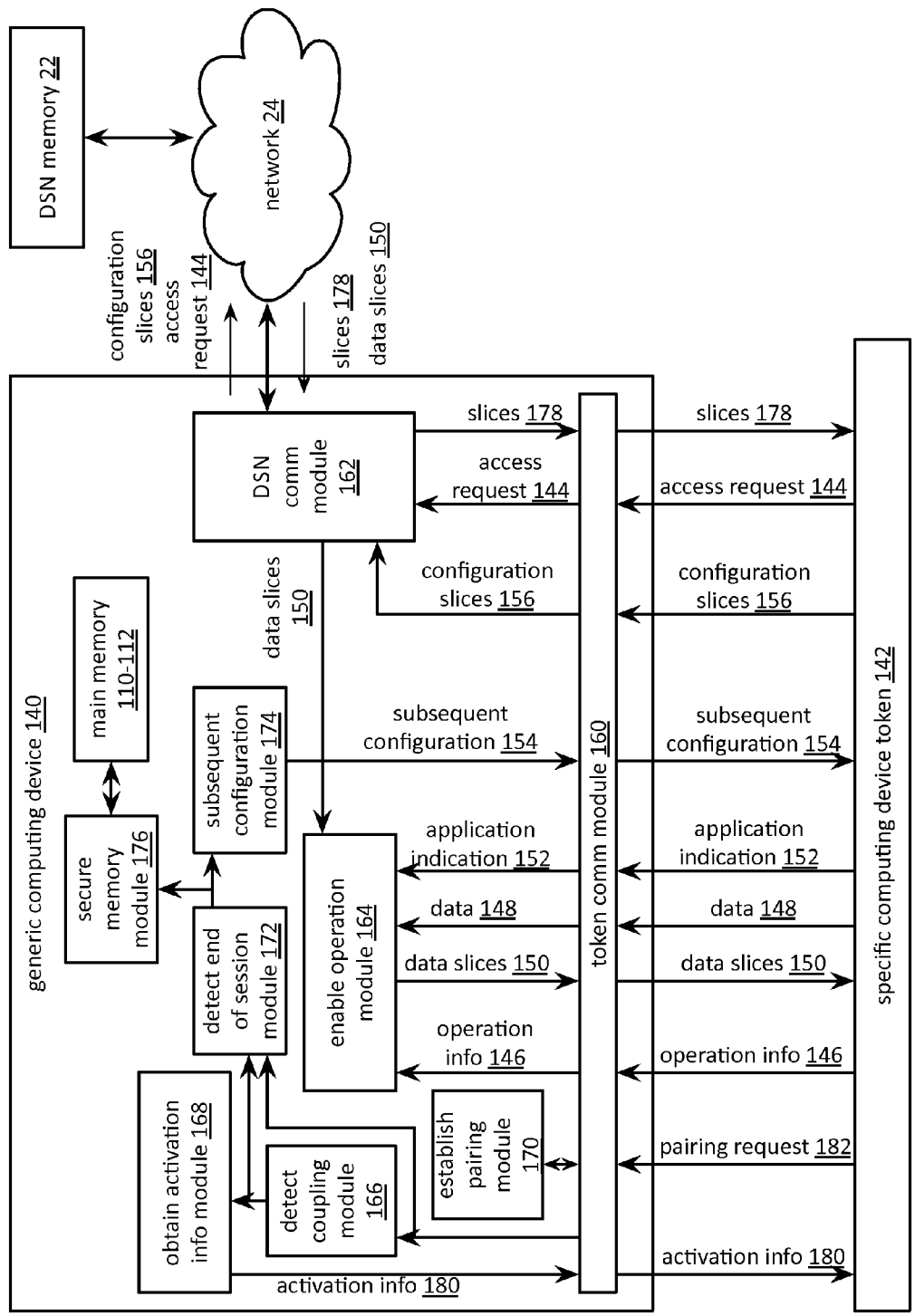
FIG. 7B is a schematic block diagram of another embodiment of a computing system in accordance with the present invention.

FIG. 7B is a schematic block diagram of another embodiment of a computing system that includes a generic computing device 140, a network 24, a dispersed storage network (DSN) memory 22, and a specific computing device token 142. The generic computing device 140 includes a main memory 110-112 and a module for enabling the generic computing device 140 to function as a specific computing device when the generic computing device 140 is paired with the specific computing device token 142. The module includes a token communication module 160, a DSN communication module 162, an enable operation module 164, a detect coupling module 166, an obtain activation information module 168, an establish pairing module 170, a detect end of session module 172, a subsequent configuration module 174, and a secure memory module 176.

The token communication module 160 is operable to receive a distributed storage network (DSN) access request 144 to the DSN memory 22 from the specific computing device token 142, wherein the DSN access request 144 identifies specific computing device operation information 146 that is stored as one or more of sets of encoded data slices 178 in the DSN memory 22 and wherein the specific computing device operation information 146 was encoded using a dispersed storage error encoding function to produce the one or more of sets of encoded data slices 178. The DSN communication module 162 is operable to send the DSN access request 144 to the DSN memory 22 and receive the one or more sets of encoded data slices 178 from the DSN memory 22. The token communication module 160 is further operable to send the one or more sets of encoded data slices 178 to the specific computing device token 142 and receive the specific computing device operation information 146 from the specific computing device token 142.

The enable operation module 164 is operable to enable the generic computing device to function as a specific computing device in accordance with the specific computing device operation information 146. The enable operation module 164 functions to enable the generic computing device 140 by one or more of retrieving a plurality of sets of encoded data slices 150 from the DSN memory 22 (e.g., via the DSN communication module 162), wherein the plurality of sets of encoded data slices 150 is a dispersed storage error encoded representation of data 148 and wherein the data 148 includes one or more of at least a portion of a user application, at least a portion of a system level application, at least a portion of a file, and at least a portion of a file directory; sending the plurality of sets of encoded data slices 150 to the specific computing device token 142 for decoding to recapture the data 148, receiving the data 148 from the specific computing device token 142, and processing, as the specific computing device, the data 148.

The enable operation module 164 further functions to enable the generic computing device 140 by one or more of receiving an indication of an application 152 to be executed from the specific computing device token 142 (e.g., alternatively, may also include an indication of an operating system to be utilized), retrieving a plurality of sets of encoded data slices 150 from the DSN memory 22, wherein the plurality of sets of encoded data slices 150 is a dispersed storage error encoded representation of at least a portion of a file, sending the plurality of sets of encoded data slices 150 to the specific computing device token 142 for decoding data 148 of the at least a portion of the file, receiving the data 148 from the specific computing device token 142, and configuring the generic computing device 140 to function as the specific computing device, which executes the indicated application on the data 148.

The module is further operable to establish the pairing between the generic computing device 140 and the specific computing device token 142 including the detect coupling module 166 operable to detect a coupling of the specific computing device token 142 to the generic computing device 140, the obtain activation information module 168 is operable to obtain user activation information 180 (e.g., by a lookup, outputting a user prompt, receiving a user input), the token communication module 160 is further operable to send the user activation information 180 to the specific computing device token 142 and receive a pairing request 182 from the specific computing device token 142 when the specific computing device token 142 favorably authenticates the user activation information 180, and the establish pairing module 170 is operable to establish the pairing.

The detect end of session module 172 is operable to detect an end of session between the generic computing device 140 and the specific computing device token 142. The detecting includes at least one of detecting a broken coupling between the generic computing device 140 and the specific computing device token 142 (e.g., directly or via the detect coupling module 166) and receiving an end of session request (e.g., from the specific computing device token 142). When the end of session is detected, the subsequent configuration module 174 is operable to capture a subsequent configuration of the generic computing device 140 functioning as the specific computing device to produce subsequent configuration information 154, the token communication module 160 is further operable to send the subsequent configuration information 154 to the specific computing device token 142 for encoding using the dispersed storage error encoding function to produce one or more sets of encoded configuration slices 156 and receive the one or more sets of encoded configuration slices 156 from the specific computing device token 142; the DSN communication module 162 is further operable to send the one or more sets of encoded configuration slices 156 to the DSN memory 22 for storage therein; and the secure memory module 176 is operable to secure main memory 110-112 (e.g., persistent memory 110 and/or non-persistent memory 112) of the generic computing device 140 regarding the functioning as the specific computing device.

The capturing of the subsequent configuration of the generic computing device 140 includes reading and identifying current configuration information and adding a timestamp to produce the subsequent configuration information 154. The securing of main memory 110-112 includes clearing at least a portion of the main memory 110-112, setting at least a portion of the main memory 110-112 to one or more default values, facilitating reversion of values of at least a portion of the main memory 110-112 to one or more previous values, erasing the main memory 110-112, and encrypting values of the main memory 110-112 to produce encrypted values and storing encrypted values in the main memory 110-112 to replace the values.

Figure 7C:
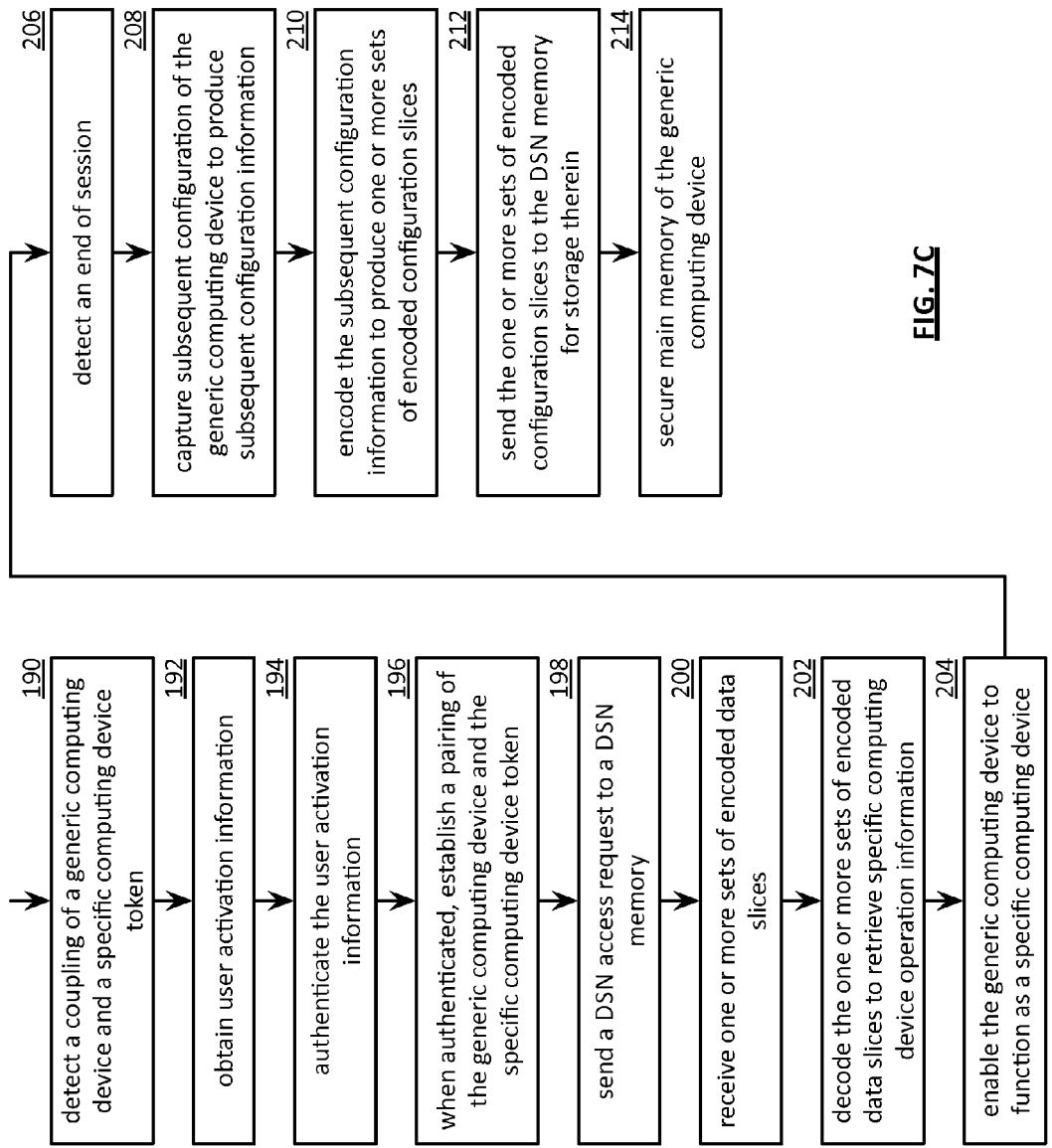
FIG. 7C is a flowchart illustrating an example of configuring a generic computing device in accordance with the present invention.

FIG. 7C is a flowchart illustrating an example of configuring a generic computing device (e.g., a user device) when the generic computing device is paired with a specific computing device token. The method begins at step 190 to establish the pairing between the generic computing device and the specific computing device token where at least one of the generic computing device and the specific computing device token detects a coupling of the specific computing device token to the generic computing device. Such a coupling includes a direct physical connection such as a universal serial bus (USB) interface connection and a functional connection via a network. For example, the generic computing device indicates a detection of the coupling when a favorable availability query response is received from the specific computing device token in response to sending an availability query request to the specific computing device token.

The method continues at step 192 where the generic computing device obtains user activation information. The obtaining includes at least one of a lookup, outputting a user prompt, and receiving a user input. The user activation information includes one or more of an active indicator, an identifier of the generic computing device, a password, a user identifier, a signature, a public key, a credential, a vault identifier, a user identifier, an access code, a timestamp associated with a previous specific computing device operation information, and an identifier for the specific computing device operation information.

The method continues at step 194 where the specific computing device token authenticates the user activation information. The authenticating includes indicating authenticated when a user identifier (ID) and a password compare favorably to authentication information of the specific computing device operation information. The method continues at step 196 where the specific computing device token establishes the pairing when the user activation information is authenticated. For example, the specific computing device token sends a pairing request to the generic computing device.

The method continues at step 198 where the specific computing device token sends a distributed storage network (DSN) access request to DSN memory via the generic computing device, wherein the DSN access request identifies specific computing device operation information that is stored as one or more of sets of encoded data slices in the DSN memory and wherein the specific computing device operation information was encoded using a dispersed storage error encoding function to produce the plurality of sets of encoded data slices. Alternatively, the specific computing device token sends the DSN access request directly to the DSN memory. The specific computing device operation information includes one or more of operating system information (e.g., an operating system, a portion of the operating system, an operating system identifier), software application information (e.g., a software application, a portion of the software application, a software application identifier, configuration information of the software application), file information (e.g., a data file, a portion of the data file, a data file identifier, an active pointer of the data file), a machine state indicator, a machine pointer value, a machine register value, a machine stack value set, a next machine instruction ID, a data register data, a signature, a key, virtual memory configuration information (e.g., an amount of virtual memory, an assignment for the virtual memory), and computing device hardware configuration information. (e.g., a port identifier, a communication speed, a configuration protocol identifier).

The method continues at step 200 where the specific computing device token receives the one or more of sets of encoded data slices from the DSN memory via the generic computing device. Alternatively, the specific computing device token receives the one or more sets of encoded data slices directly from the DSN memory. The method continues at step 202 where the specific computing device token decodes the one or more of sets of encoded data slices to retrieve the specific computing device operation information.

The method continues at step 204 to enable the generic computing device to function as a specific computing device in accordance with the specific computing device operation information. In such a scenario, the generic computing device activates a virtual machine operational mode. The enabling the generic computing device includes one or more of retrieving, by the specific computing device token, a plurality of sets of encoded data slices from the DSN memory via the generic computing device (e.g., through the generic computing device or directly from the DSN memory), wherein the plurality of sets of encoded data slices is a dispersed storage error encoded representation of data and wherein the data includes one or more of at least a portion of a user application, at least a portion of a system level application, at least a portion of a file, and at least a portion of a file directory; decoding, by the specific computing device token, the plurality of sets of encoded data slices to recapture the data; and processing, by the generic computing device as the specific computing device, the data. The enabling the generic computing device further includes one or more of providing, by the specific computing device token, an indication of an application to be executed by the generic computing device (alternatively, may also include an indication of an operating system to be utilized), retrieving, by the specific computing device token, a plurality of sets of encoded data slices from the DSN memory via the generic computing device, wherein the plurality of sets of encoded data slices is a dispersed storage error encoded representation of at least a portion of a file, decoding, by the specific computing device token, the plurality of sets of encoded data slices to recapture data of the at least a portion of the file, and configuring, by the specific computing device token, the generic computing device to function as the specific computing device, which executes the indicated application on the data.

The method continues at step 206 where at least one of the generic computing device and the specific computing device token detect an end of session between the generic computing device and the specific computing device token. The detecting includes at least one of detecting a broken coupling between the generic computing device on a specific computing device token and receiving an end of session request from at least one of the generic computing device and the specific computing device token.

When the end of session is detected, the method continues at step 208 where the generic computing device captures a subsequent configuration of the generic computing device functioning as the specific computing device to produce subsequent configuration information. The subsequent configuration information includes at least one of an active software application identifier (ID), a current machine state indicator, a current machine pointer value, a current machine register value, a next machine instruction ID, a current data register data, a signature, a key, virtual memory configuration information, and computing device hardware configuration information. The capturing the subsequent configuration information includes reading and identifying current configuration information and adding a timestamp to produce the subsequent configuration information.

The method continues at step 210 where the specific computing device token encodes the subsequent configuration information using the dispersed storage error encoding function to produce one or more sets of encoded configuration slices. The method continues at step 212 for the specific computing device token sends, via the generic computing device or directly, the one or more sets of encoded configuration slices to the DSN memory for storage therein. The sending includes storing a source name associated with the one or more sets of encoded configuration slices in the specific computing device token. The method continues at step 214 where the generic computing device secures main memory of the generic computing module regarding the functioning as the specific computing device. The securing includes clearing at least a portion of the main memory, setting at least a portion of the main memory to one or more default values, facilitating reversion of values of at least a portion of the main memory to one or more previous values, erasing the main memory, and encrypting values of the main memory to produce encrypted values and storing encrypted values in the main memory to replace the values. Alternatively, or in addition to, the generic computing device disables the generic computing device from functioning as the specific computing device. For example, the generic computing device suspends executing instructions associated with the specific computing device operation information. In such a suspension scenario, the generic computing device deactivates the virtual machine operational mode.

Figure 8:
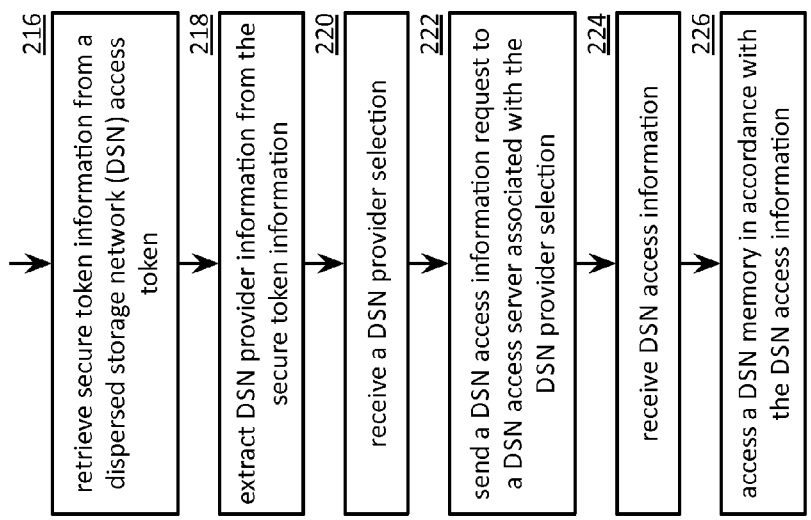
FIG. 8 is a flowchart illustrating an example of obtaining dispersed storage network (DSN) access information in accordance with the present invention.

FIG. 8 is a flowchart illustrating an example of obtaining dispersed storage network (DSN) access information. The method begins at step 216 where a processing module (e.g., of a user device) retrieves secure token information from a DSN access token. The method continues at step 218 where the processing module extracts DSN provider information from the secure token information. The DSN provider information includes one or more of a list of one or more DSN providers, one or more DSN access addresses corresponding to the one or more DSN providers, one or more estimated performance levels of the one or more DSN providers, one or more estimated reliability levels of the one or more DSN providers, cost information corresponding to each DSN provider of the one or more DSN providers, and one or more DSN access server access addresses corresponding to the one or more DSN providers.

The method continues at step 220 where the processing module receives a DSN provider selection. The receiving may include outputting a user prompt (e.g., to a user device display), wherein the user prompt includes at least some of the DSN provider information, and receiving (e.g., from a user device keyboard) the DSN provider selection. The DSN provider selection may include a DSN identifier (ID) associated with a selected DSN provider. The method continues at step 222 where the processing module sends a DSN access information request to a DSN access server associated with the DSN provider selection (e.g., based on the DSN ID) utilizing a DSN access server access address associated with the DSN access server. The request may include one or more of a user device ID, a group ID, a vault ID, and a DSN access token ID.

The method continues at step 224 where the process module receives DSN access information in response to sending the DSN access information request. The DSN access information may include a plurality of dispersed storage (DS) unit IDs. The method continues at step 226 where the processing module accesses a DSN memory in accordance with the DSN access information (e.g., utilizing the plurality of DS unit IDs, a credential, the user device ID, and a password). The accessing may include at least one of reading slices, writing slices, deleting slices, listing slices, modifying slices, and replacing slices.

Figure 9A:
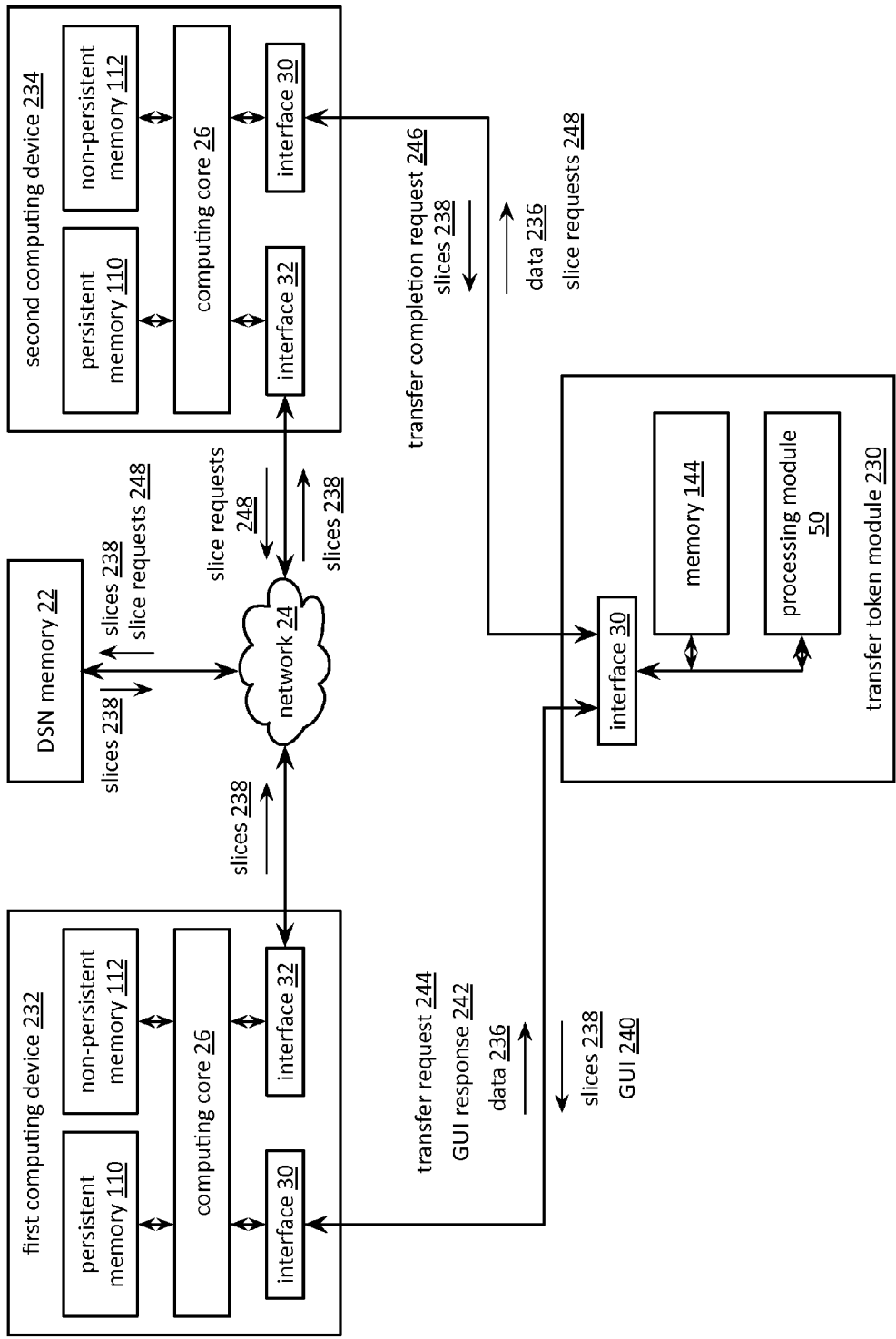
FIG. 9A is a schematic block diagram of another embodiment of a computing system in accordance with the present invention.

FIG. 9A is a schematic block diagram of another embodiment of a computing system that includes a transfer token module 230, a network 24, a dispersed storage network (DSN) memory 22, a first computing device 232, and second computing device 234. The first computing device 232 includes a computing core 26, an interface 30, an interface 32, and memory 110-112 (e.g., persistent memory 110, non-persistent memory 112). The second computing device 234 includes the computing core 26, the interface 30, the interface 32, and memory 110-112. The transfer token module 230 includes an interface module 30 for interfacing with one or more of the first computing device 232 and the second computing device 234, a memory 144, and a processing module 50 operably coupled to the memory 144. The interface module 30 includes at least one of a universal serial bus (USB) interface module, a Bluetooth interface module, a fire-wire interface module, a 60 GHz wireless transceiver, and a Wi-Fi interface module.

When the transfer token module 230 is paired with the first computing device 232, the processing module 50 is operable to receive data 236 from the first computing device 232, encode the data 236 utilizing a dispersed storage error encoding function to produce one or more sets of encoded data slices 238 (e.g., encoding function may include utilizing encryption with a key associated with the transfer token module), and send, via the first computing device 232, the one or more sets of encoded data slices 238 to a target destination. The processing module 50 is further operable to, when the transfer token module 230 is paired with the second computing device 234, retrieve, via the second computing device 234, the one or more sets of encoded data slices 238 from the target destination, decode the one or more sets of encoded data slices 238 utilizing the dispersed storage error encoding function to recapture the data 236, and send the data 236 to the second computing device 234 for storage by the second computing device 234.

The dispersed storage error encoding function includes a set of dispersed storage error encoding parameters unique to the transfer token module 230 (e.g., unique encryption key, unique pillar width and decode threshold combination). The parameters may be set by one or more of a user, preprogramming, and programmed upon activation. The target destination includes one or more of the second computing device 234, the first computing device 232, the dispersed storage network (DSN) memory 22, a server, a third computing device, and network memory (e.g., conventional on-line storage).

The processing module 50 is further operable to send the one or more sets of encoded data slices 238 to the target destination via the network 24 (e.g., a wide area network, a local area network, a personal area network, the internet) when the transfer token module 230 is paired with the first computing device 232, retrieve the one or more sets of encoded data slices 238 from the target destination via the network 24 when the transfer token module 230 is paired with the second computing device 234. The processing module 50 functions to receive data 236 from the first computing device 232 by sending a graphic user interface (GUI) 240 regarding the data transfer (e.g., to prompt a user and/or receive a user input such as dragging a file icon to a transfer folder) and receiving the data 236 from the first computing device 232 in accordance with a GUI response 242 to the GUI 240 received by the first computing device 232 (e.g., selecting the data based on the response). The processing module 50 further functions to receive data 236 from the first computing device 232 by receiving a transfer request 244 that includes the data 236 from the first computing device 232. The transfer request 244 may include one or more of the data 236, a data identifier (ID), first and second computing device IDs, user IDs, authentication info including one or more of a key, a password, a credential, and a signature.

The processing module 50 functions to send the one or more sets of encoded data slices 238 to the target destination by generating transfer information regarding transferring the data 236 to the second computing device 234 and storing the transfer information in memory 144 of the transfer token module 230. The transfer information includes one or more of a data ID, first and second computing device IDs, user IDs, a dispersed storage error decoding function, a source name, a DSN memory ID, DS unit internet protocol address, slice names, a slice encryption key ID, and authentication information including one or more of a key, a password, a credential, and a signature.

The processing module 50 further functions to retrieve the one or more sets of encoded data slices 238 by receiving a transfer completion request 246 that includes transfer completion information from the second computing device 234, retrieving the transfer information from the memory 144 of the transfer token module 230 based on the transfer completion information, generating one or more sets of at least a threshold number of data slice read requests 248 based on the transfer information, and sending, via the second computing device 234, the one or more sets of the at least the threshold number of data slice read requests 248 to the target destination. The transfer completion information includes one or more of the data ID, the first computing device ID, the second computing device ID, a user ID, a source name, and authentication info including at least one of a password input by a user of the second computing device, a credential, and a signature. The retrieving the transfer information may include validating the transfer completion request 246 prior to extracting DSN access information from the transfer information when transfer completion information of the request 246 compares favorably to the transfer information. For example, the request 246 is validated when an extracted password of the request 246 matches a password extracted from the retrieved transfer information.

The generating the one or more sets of at least the threshold number of data slice read requests 248 includes generating slice names corresponding to the one of more sets of encoded data slices 238 based on a source name of the transfer information.

Alternatively, the generating the one or more sets of at least the threshold number of data slice read requests 248 includes prompting a user of the second computing device 234 with available files to be transferred. The sending the one or more sets of the at least the threshold number of data slice read requests 248 includes identifying the target destination (e.g., a set of dispersed storage unit internet protocol addresses) based on the transfer information and sending the requests 248 to the identified target destination. The processing module 50 is further operable to, when the data 236 is stored by the second computing device 234 (e.g., receive a storage complete indication from the second computing device 234), delete the transfer information, and facilitate deletion of the one or more sets of encoded data slices 238 from the target destination.

Figure 9B:
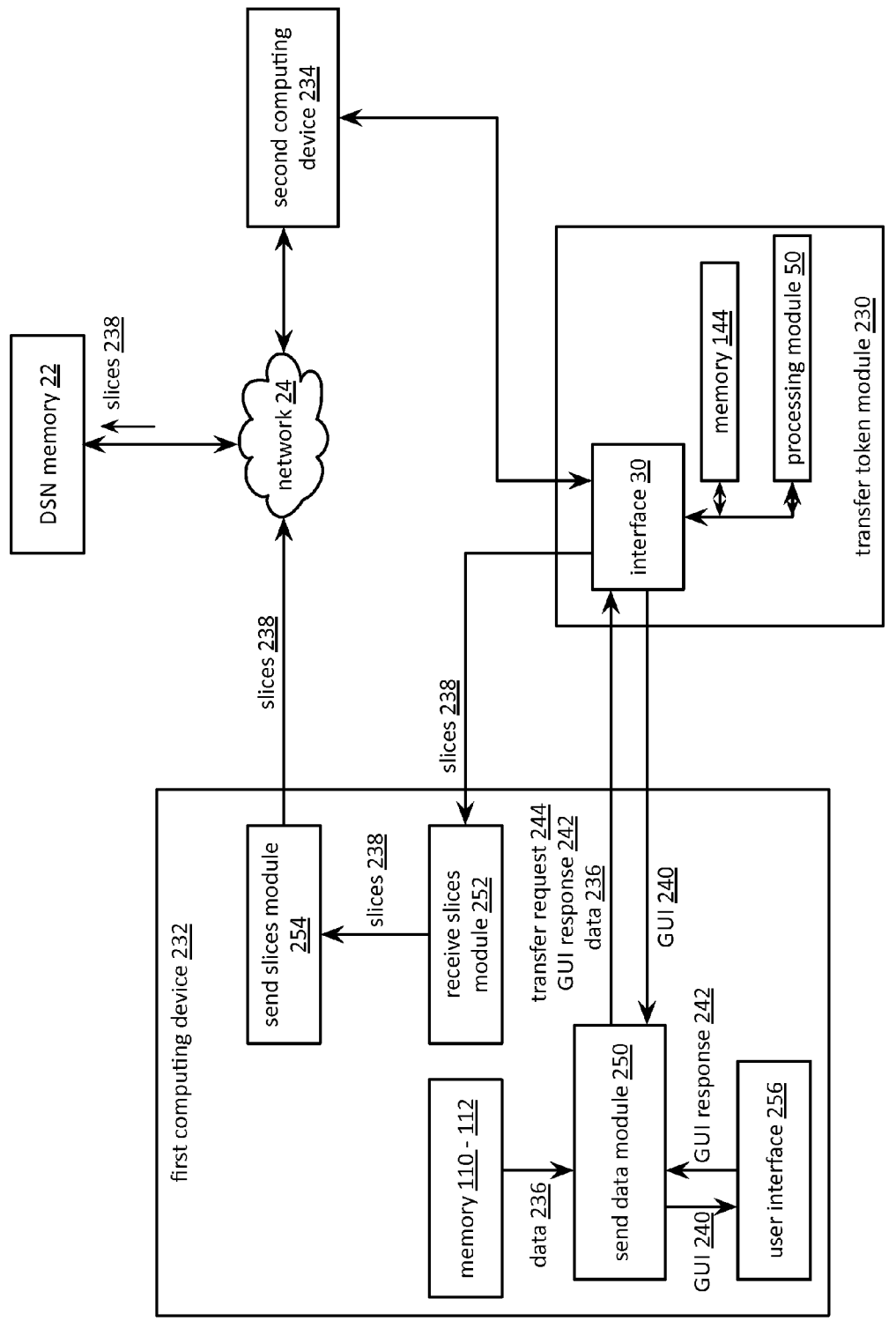
FIG. 9B is a schematic block diagram of another embodiment of a computing system in accordance with the present invention.

FIG. 9B is a schematic block diagram of another embodiment of a computing system that includes a transfer token module 230, a network 24, a dispersed storage network (DSN) memory 22, a first computing device 232, and a second computing device 234. The first computing device 232 includes memory 110-112 (e.g., persistent memory 110, non-persistent memory 112), a first computing device user interface 256, and a module for enabling the first computing device 232 to transfer data 236 from the first computing device 232 to the second computing device 234 using the transfer token module 230 when the first computing device 232 is paired with the transfer token module 230. The module includes a send data module 250, a receive slices module 252, and a send slices module 254.

The send data module 250 is operable to send the data 236 to the transfer token module 230. The send data module 250 functions to send the data to the transfer token module by one or more of receiving a graphic user interface (GUI) 240 regarding the data transfer from the transfer token module 230, outputting the GUI 240 regarding the data transfer to the first computing device user interface 256, receiving a GUI response 242 to the GUI 240 regarding the data transfer (e.g., a user input via the first computing device user interface 256), and in accordance with the response, sending the data 236 to the transfer token module 230 (e.g., selecting the data 236 from the memory 110-112 based on the GUI response 242). The send data module 250 further functions to send the data 236 to the transfer token module 230 by generating a transfer request 244 that includes the data 236. The transfer request 244 includes one or more of the data 236, a data identifier (ID), first and second computing device IDs, user IDs, and authentication information including at least one of a key, a password, a credential, and a signature.

The receive slices module 252 is operable to receive one or more sets of encoded data slices 238 from the transfer token module 230, wherein the transfer token module 230 encodes the data 236 utilizing a dispersed storage error encoding function to produce the one or more sets of encoded data slices 238. The send slices module 254 is operable to send the one or more sets of encoded data slices 238 to a target destination. The target destination includes one or more of the second computing device 234, the first computing device 232, the DSN memory 22, a server, a third computing device, and network memory. The send slices module 254 functions to send the one more sets of encoded data slices 238 to the target destination by sending the one or more sets of encoded data slices 238 to the target destination via the network 24.

Figure 9C:
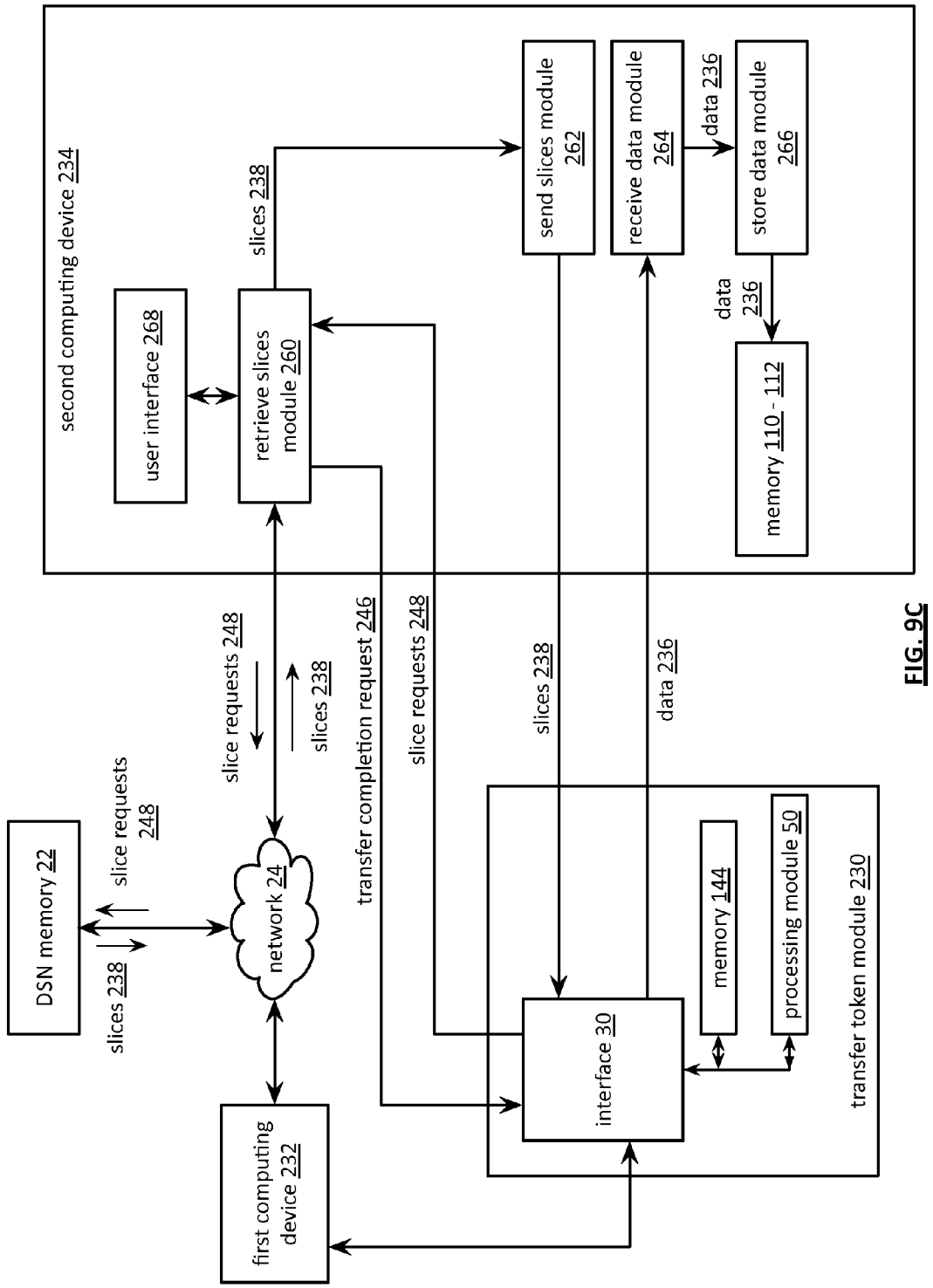
FIG. 9C is a schematic block diagram of another embodiment of a computing system in accordance with the present invention.

FIG. 9C is a schematic block diagram of another embodiment of a computing system that includes a transfer token module 230, a network 24, a dispersed storage network (DSN) memory 22, a first computing device 232, and a second computing device 234. The second computing device 234 includes memory 110-112, a user interface 268, and a module for enabling the second computing device 234 to transfer data 236 from the first computing device 232 to the second computing device 234 using the transfer token module 230 when the second computing device 234 is paired with the transfer token module 230. The module includes a retrieve slices module 260, a send slices module 262, a receive data module 264, and a store data module 266.

The retrieve slices module 260 is operable to retrieve one or more sets of encoded data slices 238 from a target destination, wherein the data 236 was encoded utilizing a dispersed storage error encoding function to produce the one or more sets of encoded data slices 238 and wherein the one or more sets of encoded data slices 238 were stored at the target destination. The target destination comprises one or more of the second computing device 234, the first computing device 232, the DSN memory 22, a server, a third computing device, and a network memory.

The retrieve slices module 260 functions to retrieve the one or more encoded data slices 238 from the target destination by retrieving the one or more sets of encoded data slices 238 from the target destination via the network 24. The retrieve slices module 260 further functions to retrieve the one or more sets of encoded data slices 238 from the target destination by generating a transfer completion request 246 that includes transfer completion information, sending the transfer completion request 246 to the transfer token module 230, receiving one or more sets of at least a threshold number of data slice read requests 248 from the transfer token module 230, wherein the one or more sets of at least the threshold number of data slice read requests 248 are generated based on the transfer completion request 246, sending the one or more sets of at least the threshold number of data slice read requests 248 to the target destination, and receiving the one or more sets of encoded data slices 238 from the target destination.

The transfer completion information includes one or more of a data identifier (ID), a first computing device ID, a second computing device ID, a user ID, a source name, and authentication info including at least one of a password input by a user, via the user interface 268, of the second computing device 234, a credential, and a signature. The generating the transfer completion request 246 may also include prompting a user of the second computing device 234, via the user interface 268, with available files to be transferred. The sending the one or more sets of at least the threshold number of data slice read request 248 includes identifying the target destination (e.g., a set of dispersed storage unit internet protocol addresses) based on the transfer completion request 246 and sending the requests 248 to the identified target destination.

The send slices module 262 is operable to send the one or more sets of encoded data slices 238 to the transfer token module 230. The receive data module 264 is operable to receive the data 236 from the transfer token module 230, wherein the transfer token module 230 decodes the one more sets of encoded data slices 238 utilizing the dispersed storage error encoding function to recapture the data 236. The store data module 266 is operable to store the data 236. The store data module 266 functions to store the data 236 by one or more of storing the data 236 in memory 110-112 of the second computing device 234 and sending a storage complete indication to the transfer token module 230 when the data 236 is successfully stored in the memory 110-112 of the second computing device 234.

Figure 9D:
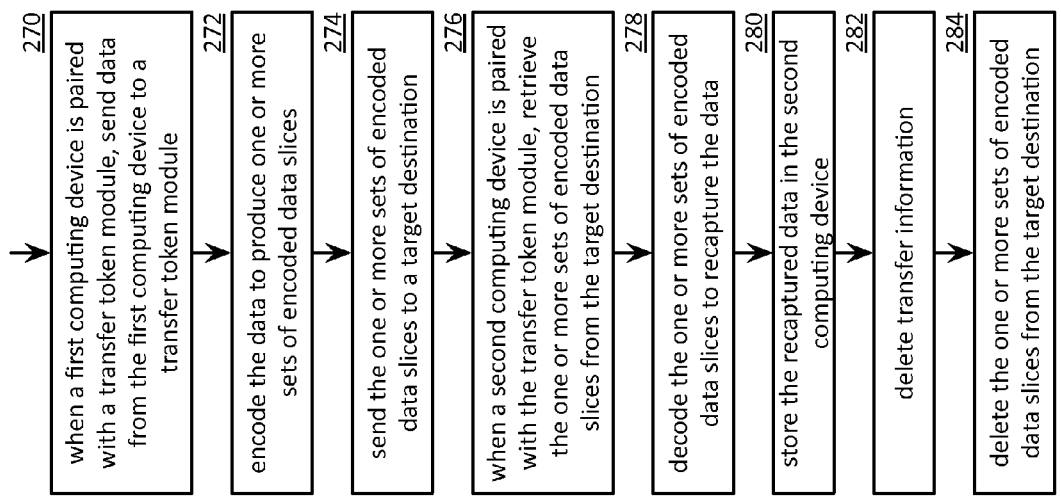
FIG. 9D is a flowchart illustrating an example of transferring data in accordance with the present invention.

FIG. 9D is a flowchart illustrating an example of transferring data from a first computing device to a second computing device using a transfer token module. The method begins at step 270 when the first computing device is paired with the transfer token module where the first computing device sends the data to the transfer token module. The sending the data to the transfer token module further includes sending, by the transfer token module, a graphic user interface (GUI) regarding the data transfer, receiving, by the first computing device, a response to the GUI regarding the data transfer, and in accordance with the response, sending, by the first computing device, the data to the transfer token module. The sending the data to the transfer token module further includes generating, by the first computing device, a transfer request that includes the data. The request may include one or more of the data, a data identifier (ID), first and second computing device IDs, user IDs, authentication information including one or more of a key, a password, a credential, and a signature.

The method continues at step 272 where the transfer token module encodes the data utilizing a dispersed storage error encoding function to produce one or more sets of encoded data slices. The dispersed storage error encoding function includes a set of dispersed storage error encoding parameters unique to the transfer token module (e.g., a unique encryption key, a unique pillar width and decode threshold combination). The parameters may be set by a user, preprogrammed, or programmed upon activation.

The method continues at step 274 where the transfer token module sends, via the first computing device, the one or more sets of encoded data slices to a target destination. The target destination includes one or more of the second computing device, the first computing device, a dispersed storage network (DSN) memory, a server, a third computing device, and network memory. The sending the one or more sets of encoded data slices to the target destination includes sending the one or more sets of encoded data slices to the target destination via a network. For example, the transfer token module sends, via the first computing device, the one or more sets of encoded data slices to the DSN memory via the network. The sending the one or more sets of encoded data slices to the target destination further includes generating, by the transfer token module, transfer information regarding transferring the data to the second computing device and storing, by the transfer token module, the transfer information in memory of the transfer token module.

The method continues at step 276 when the second computing device is paired with the transfer token module where the transfer token module retrieves, via the second computing device, the one or more sets of encoded data slices from the target destination. The retrieving the one or more sets of encoded data slices from the target destination includes retrieving the one or more sets of encoded data slices from the target destination via the network. For example, the transfer token module retrieves, via the second computing device, the one or more sets of encoded data slices from the DSN memory via the network. The retrieving of the one or more sets of encoded data slices further includes generating, by the second computing device, a transfer completion request that includes transfer completion information, sending, by the second computing device, the transfer completion request to the transfer token module, retrieving, by the transfer token module, the transfer information from the memory of the transfer token module based on the transfer completion information, generating, by the transfer token module, one or more sets of at least a threshold number of data slice read requests based on the transfer information, and sending, by the transfer token module via the second computing device, the one or more sets of the at least the threshold number of data slice read requests to the target destination.

A method continues at step 278 where the transfer token module decodes the one or more sets of encoded data slices utilizing the dispersed storage error encoding function to recapture the data. The method continues at step 280 where the second computing device stores the data. The method continues at step 282, when the data is stored by the second computing device, with the transfer token module deleting the transfer information. The method continues at step 284 where the transfer token module facilitates deletion of the one or more sets of encoded data slices from the target destination. For example, the transfer token module generates one or more sets of delete encoded data slice requests and sends the one or more sets of delete encoded data slice requests, via the second computing device, to the DSN memory via the network.

FIG. 10A is a flowchart illustrating an example of storing data. The method begins with step 286 where a processing module (e.g., of a user device) dispersed storage error encodes data to produce a plurality of sets of encoded data slices in accordance with dispersed storage error coding parameters. The method continues at step 288 where the processing module determines selection information. The selection information includes one or more of a number of slices to store in a dispersed storage network (DSN) memory, a number of slices to store in a DSN access token, a number of slices to store in both the DSN memory and the DSN access token, and a plurality of slice names associated with the plurality of sets of encoded data slices. The determining of the selection information may be based on one or more of the dispersed storage error coding parameters, a DSN access token indicator, a DSN access token slice memory capacity indicator, a data size indicator associated with the plurality of sets of encoded data slices, a performance requirement, a security requirement, an availability requirement, a reliability requirement, and a lookup. For example, the processing module determines to store a decode threshold number of encoded data slices of each set of the plurality of sets of encoded data slices in the DSN access token when a performance requirement indicates a very low access latency time and the DSN access token slice memory capacity indicator indicates sufficient capacity to store such a portion of the encoded data slices.

The method continues at step 290 where the processing module selects a selection number of encoded data slices of each set of the plurality of sets of encoded data slices to produce a plurality of portions of sets of encoded data slices in accordance with the selection information. For example, the processing module selects none of encoded data slices of each set of the plurality sets of encoded data slices when the selection number is zero based on the selection information. As another example, the processing module selects all encoded data slices of each set of the plurality of sets of encoded data slices to produce the plurality of portions of sets of encoded data slices when the selection number is all based on the selection information. As yet another example, the processing module selects a difference of a pillar width and a decode threshold number of encoded data slices of each set of the plurality of sets of encoded data slices to produce the plurality of portions of sets of encoded data slices when the selection number is the difference of the pillar width and the decode threshold based on the selection information.

The method continues at step 292 where the processing module sends the plurality of portions of sets of encoded data slices to the DSN memory utilizing DSN access information for storage therein. For example, the processing module sends the difference of the pillar width and the decode threshold number of encoded data slices of each set of the plurality of sets of encoded data slices to the DSN memory with associated slice names when the processing module selects the difference of the pillar width and the decode threshold number of encoded data slices of each set of the plurality of sets of encoded data slices to produce the plurality of portions of sets of encoded data slices.

The method continues at step 294 where the processing module stores remaining encoded data slices of the plurality of sets of encoded data slices in the DSN access token. The storing includes storing slice names associated with the remaining encoded data slices. For example, the processing module stores a decode threshold number of encoded data slices of each set of the plurality of sets of encoded data slices in the DSN access token when the processing module selects the difference of the pillar width and the decode threshold number of encoded data slices of each set of the plurality of sets of encoded data slices to produce the plurality of portions of sets of encoded data slices. A method to reproduce the data is discussed in greater detail with reference to FIG. 10B.

FIG. 10B is a flowchart illustrating an example of retrieving data, which includes similar steps to FIG. 10A. The method begins with step 288 of FIG. 10A where a processing module (e.g., of a user device) determines selection information and continues at step 298 where the processing module determines slice names associated with encoded data slices of each set of a plurality of sets of encoded data slices to produce a first plurality of slice names associated with a plurality of portions of sets of encoded data slices in accordance with the selection information. For example, the processing module determines no slice names associated with no encoded data slices of each set of the plurality sets of encoded data slices when a selection number of the selection information is zero. As another example, the processing module determines all slice names associated with all encoded data slices of each set of the plurality of sets of encoded data slices to produce the first plurality of slice names associated with the plurality of portions of sets of encoded data slices when the selection number is all. As yet another example, the processing module determines slice names associated with a difference of a pillar width and a decode threshold number of encoded data slices of each set of the plurality of sets of encoded data slices to produce the first plurality of slice names associated with the plurality of portions of sets of encoded data slices when the selection number is the difference of the pillar width and the decode threshold.

The method continues at step 300 where the processing module retrieves the plurality of portions of sets of encoded data slices from a dispersed storage network (DSN) memory utilizing the first plurality of slice names. For example, the processing module sends a plurality of slice retrieval request messages to the DSN memory in accordance with DSN access information, wherein each of the request messages includes at least one slice name of the first plurality of slice names. The processing module receives the plurality of portions of sets of encoded data slices from the DSN memory.

The method continues at step 302 where the processing module determines a second plurality of slice names associated with remaining encoded data slices of the plurality of sets of encoded data slices. For example, the processing module determines slice names associated with a decode threshold number of encoded data slices of each set of the plurality of sets of encoded data slices to produce the second plurality of slice names when the processing module determines slice names associated with a difference of the pillar width and the decode threshold number of encoded data slices of each set of the plurality of sets of encoded data slices as the first plurality of slice names.

The method continues at step 304 where the processing module retrieves the remaining encoded data slices of the plurality of sets of encoded data slices from a DSN access token utilizing the second plurality of slice names. For example, the processing module sends a plurality of slice retrieval request messages to the DSN access token in accordance, wherein each of the request messages includes at least one slice name of the second plurality of slice names. As another example, the processing module determines a plurality of DSN access token addresses based on the second plurality of slice names (e.g., a table lookup, wherein the table correlates slice names and DSN access token addresses) and retrieves the remaining encoded data slices from the DSN access token utilizing the plurality of DSN access token addresses.

The method continues at step 306 where the processing module dispersed storage error decodes retrieved encoded data slices to produce the data. For example, the processing module aggregates the plurality of portions of sets of encoded data slices and the associated remaining encoded data slices to produce the plurality of sets of encoded data slices and dispersed storage error decodes the plurality of sets of encoded data slices to produce the data.

Figure 11A:
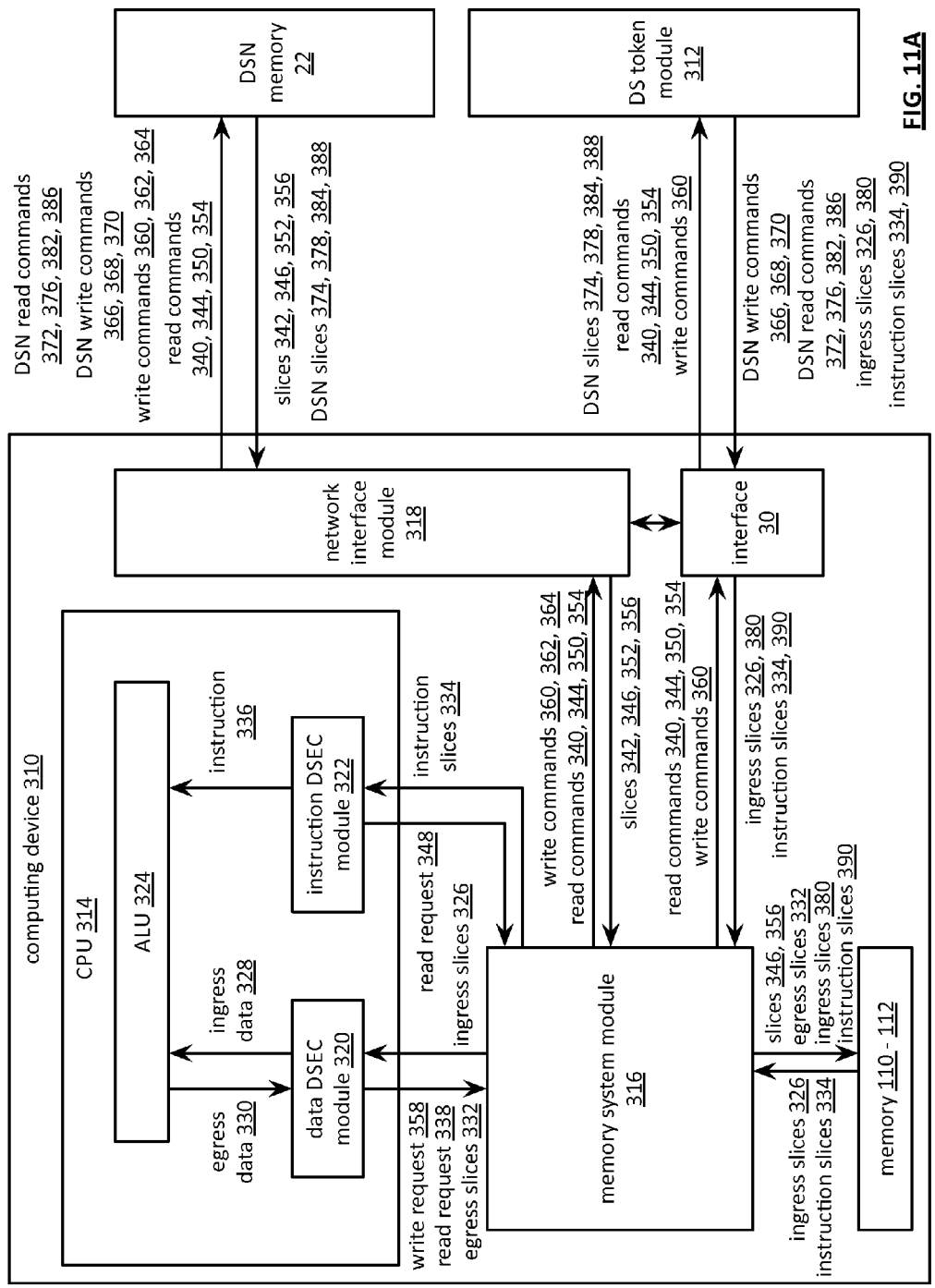
FIG. 11A is a schematic block diagram of another embodiment of a computing system in accordance with the present invention.

FIG. 11A is a schematic block diagram of a an embodiment of a computing device 310 that includes a central processing unit (CPU) 314, a memory system module 316, a network interface module 318 (e.g., an interface 32), a memory 110-112 (e.g., at least one of a persistent memory 110 and a non-persistent memory 112), and an interface 30. The interface 30 provides interfacing of the computing device 310 with a dispersed storage (DS) token module 312. The CPU includes a data dispersed storage error coding (DSEC) module 320, an instruction DSEC module 322, and an arithmetic logic unit (ALU) 324. The data DSEC module 320 is operable to DSEC decode one or more sets of encoded ingress data slices 326 to recapture ingress data 328 and DSEC encode egress data 330 to produce one or more sets of encoded egress data slices 332. The ingress data 328 may include one or more of a data file, data content, application software, and application data utilized by one or more applications. The instruction DSEC module 322 is operable to DSEC decode one or more sets of encoded instruction slices 334 to recapture an instruction 336. The ALU 324 is operable to, at least one of, execute the instruction 336 on the ingress data 328 and execute the instruction 336 to produce the egress data 330. For example, the ALU 324 adds a first variable of the ingress data 328 to a second variable of the ingress data 328 to produce a sum of the first and second variables as the egress data 331 the instruction 336 includes a summation instruction.

The memory system module 316 is operable to coordinate retrieval of the one or more sets of encoded ingress data slices 326 from memory (e.g., one or more of main memory 110-112 and a dispersed storage network (DSN) memory 22), coordinate retrieval of the one or more sets of encoded instruction slices 334 from the memory, and coordinate storage of the one or more sets of encoded egress data slices 332 in the memory. The network interface module 318 is operable to facilitate the retrieval of the one or more sets of encoded ingress data slices 326 from the memory and when the one or more sets of encoded ingress data slices 326 is stored in DSN memory 22 of the memory, facilitate the retrieval of the one or more sets of encoded instruction slices 334 from the memory when the one or more sets of encoded instruction slices 334 is stored in the DSN memory 22, and facilitate the storage of the one or more sets of encoded egress data slices 332 in the memory when the one or more sets of encoded egress data slices 332 is to be stored in the DSN memory 22. The DSN memory 22 is accessible via one or more of a local area network (LAN), a wide-area network (WAN), Internet, and a personal area network.

The data DSEC module 320 is further operable to issue a read request 338 to the memory system module 316 for retrieval of the one or more sets of encoded ingress data slices 326. The memory system module 316 is further operable to determine whether the one or more sets of encoded ingress data slices 326 are stored in main memory 110-112 of the computing device 310 or in the DSN memory 22. For example, the memory system module 316 determines that the one more sets of ingress data slices 326 is stored in the DSN memory 22 based on a prior retrieval from the DSN memory 22. As another example, the memory system module 316 determines that the one more sets of ingress data slices 326 is stored in the main memory 110-112 utilizing a table lookup based on a data identifier associated with the ingress data 328. When the one or more sets of encoded ingress data slices 326 are stored in the DSN memory 22, the memory system module 316 is operable to issue at least one or more of sets of at least a decode threshold number of read commands 340 to dispersed storage (DS) units of the DSN memory 22 regarding retrieval of the one or more sets of encoded ingress data slices 326 and to provide one or more sets of a least a decode threshold number of encoded data slices 342 received from the DSN memory 22 as the one or more sets of encoded ingress data slices 326 to the data DSEC module 320.

The memory system module 316 is further operable to issue a plurality of sets of at least a decode threshold number of read commands 344 to the DS units of the DSN memory 22 regarding retrieval of a plurality of sets of encoded data slices that includes the one or more sets of encoded ingress data slices 326. The memory system module 316 is further operable to coordinate storage of a plurality of sets of at least a decode threshold number of encoded data slices 346 received from the DSN memory 22 in the main memory 110-112, to retrieve the one or more sets of encoded ingress data slices 326 from main memory 110-112, and provide the one or more sets of encoded ingress data slices 326 to the data DSEC module 320.

The instruction DSEC module 322 is further operable to issue a read request 348 to the memory system module 316 for retrieval of the one or more sets of encoded instruction slices 334. The memory system module 316 is further operable to determine whether the one or more sets of encoded instruction slices are stored in main memory 110-112 of the computing device 310 or in the DSN memory 22. When the one or more sets of encoded instruction slices 334 are stored in the DSN memory 22, the memory system module 316 is further operable to issue at least one or more of sets of at least a decode threshold number of read commands 350 to the DS units of the DSN memory 22 regarding retrieval of the one or more sets of encoded instruction slices 334 and to provide one or more sets of a least a decode threshold number of encoded instruction slices 352 received from the DSN memory 22 as the one or more sets of encoded instruction slices 334 to the instruction DSEC module 322.

The memory system module 316 is further operable to issue a plurality of sets of at least a decode threshold number of read commands 354 to the DS units of the DSN memory 22 regarding retrieval of a plurality of sets of encoded instruction slices that includes the one or more sets of encoded instruction slices 334, to coordinate storage of a plurality of sets of a least a decode threshold number of encoded instruction slices 356 received from the DSN memory 22 in the main memory 310-312, and to retrieve the one or more sets of encoded instruction slices 334 from main memory 310-312 and provide the one or more sets of encoded instruction slices 334 to the instruction DSEC module 322.

The data DSEC module 320 is further operable to issue a write request 358 to the memory system module 316 for storage of the one or more sets of encoded egress data slices 332. The memory system module 316 operable to coordinate storage of the one or more sets of encoded egress data slices 332 in main memory 110-112 of the computing device 310.

The memory system module 316 is further operable to determine when to transfer the one or more sets of encoded egress data slices 332 from the main memory 110-112 to the memory 22 (e.g., the one or more sets of encoded egress data slices 332 exceeds a number of slices threshold) and when the one or more sets of encoded egress data slices 332 is to be transferred from the main memory 110-112 to the DSN memory 22, issue one or more sets of at least a write threshold number of write commands 360 to DS units of the DSN memory 22 regarding the one or more sets of encoded egress data slices 332, issue one or more sets of at least the write threshold number of write commit commands 362 to the DS units when at least a write threshold number of DS units have confirmed respective ones of the one or more sets of at least the write threshold number of write commands 360, and issue one or more sets of at least the write threshold number of write finalize commands 364 to the DS units when at least a write threshold number of DS units have confirmed respective ones of the one or more sets of at least the write threshold number of write commit commands 362.

The memory system module 316 is further operable to determine when to transfer the one or more sets of encoded egress data slices 332 from the main memory 110-112 to the DSN memory 22 and when the one or more sets of encoded egress data slices 332 is to be transferred from the main memory 110-112 to the DSN memory 22, issue the one or more sets of at least a write threshold number of write commands 360 to the DS token module 312 (e.g., via interface 30). The DS token module 316 is operable to convert the one or more sets of at least a write threshold number of write commands 360 into one or more sets of at least the write threshold number of DSN write commands 366, issue the one or more sets of at least the write threshold number of DSN write commands 366 to the DS units of the DSN memory 22, issue one or more sets of at least the write threshold number of DSN write commit commands 368 to the DS units when at least a write threshold number of DS units have confirmed respective ones of the one or more sets of at least the write threshold number of DSN write commands 366, and issue one or more sets of at least the write threshold number of DSN write finalize commands 370 to the DS units when at least a write threshold number of DS units have confirmed respective ones of the one or more sets of at least the write threshold number of DSN write commit commands 368.

The converting or one or more sets of at least a write threshold number of write commands 360 into the one or more sets of at least the write threshold number of DSN write commands 366 includes converting the one or more sets of encoded egress data slices 332 into one or more sets of converted encoded egress data slices. For example, a set of the one or more sets of encoded egress data slices 332 is DSEC decoded to produce a data segment, the data segment is encoded utilizing a DSN encoding parameter (e.g., a different pillar width and/or decode threshold) to produce a set of converted encoded egress data slices, and a corresponding set of the one or more sets of at least a write threshold number of DSN write commands 366 is generated that includes the set of converted encoded egress data slices.

When the computing device 310 is paired with the DS token module 312, the CPU 314 is operable to retrieve at least one of first DSEC parameters for DSEC decoding the one or more sets of encoded ingress data slices 326, second DSEC parameters for DSEC encoding the egress data 330, and instruction DSEC parameters for DSEC decoding the one or more sets of encoded instruction slices 334. For example, the CPU 314 retrieves one or more of the first DSEC parameters, the second DSEC parameters, and the instruction DSEC parameters from the memory 110-112 via the memory system module 316. As another example, the CPU 314 retrieves one or more of the first DSEC parameters, the second DSEC parameters, and the instruction DSEC parameters from the DS token module 312 via the memory system module 316 and the interface 30.

When the data DSEC module 320 issues a read request 338 to the memory system module 316 for retrieval of the one or more sets of encoded ingress data slices 326 and the memory system module 316 determines that the one or more sets of encoded ingress data slices 326 are stored in the DSN memory 22, the memory system module 316 is further operable to issue the at least one or more of sets of at least a decode threshold number of read commands 340 to the DS token module 312 regarding retrieval of the one or more sets of encoded ingress data slices 326. The DS token module 312 is further operable to convert the at least one or more of sets of at least the decode threshold number of read commands 340 into at least one or more of sets of at least the decode threshold number of DSN read commands 372, issue, via the computing device 310, the at least one or more of sets of at least the decode threshold number of DSN read commands 372 to the DS units of the DSN memory 22, convert one or more sets of a least a decode threshold number of DSN encoded data slices 374 received from the DSN memory 22 into the one or more sets of encoded ingress data slices 326, and provide the one or more sets of encoded ingress data slices 326 to the memory system module 316. The memory system module 316 is further operable to provide the one or more sets of encoded ingress data slices 326 to the data DSEC module 320.

The converting the at least one or more sets of at least the decode threshold number of read commands 340 into the at least one or more sets of the at least the decode threshold number of DSN read commands 372 includes converting a set of read commands of the at least one or more sets of at least the decode threshold number of read commands 340 into a corresponding set of DSN read commands of the at least one or more sets of the at least the decode threshold number of DSN read commands 372. For example, a set of slice names of the set of read commands is translated into a corresponding set of slice names of the corresponding set of DSN read commands based on a table lookup. As another example, a source name of the set of read commands is translated into a corresponding source name of the corresponding set of DSN read commands based on a table lookup.

When the data DSEC module 320 issues a read request 338 to the memory system module 316 for retrieval of the one or more sets of encoded ingress data slices 326 and the memory system module 316 determines that the one or more sets of encoded ingress data slices 326 are stored in the DSN memory 22, the memory system module 316 is further operable to issue the plurality of sets of at least a decode threshold number of read commands 344 to the DSN token module 312. The DS token module 312 is further operable to convert the plurality of sets of at least the decode threshold number of read commands 344 into a plurality of sets of at least the decode threshold number of DSN read commands 376, issue, via the computing device 310, the plurality of sets of at least the decode threshold number of DSN read commands 376 to the DS units of the DSN memory 22, convert a plurality of sets of a least a decode threshold number of DSN encoded data slices 378 received from the DSN memory 22 into a plurality sets of encoded ingress data slices 380, and provide the plurality of sets of encoded ingress data slices 380 to the memory system module 316. The memory system module 316 is further operable to provide the one or more sets of encoded ingress data slices 326 of the plurality of sets of encoded ingress data slices 380 to the data DSEC module 320 and coordinate storage of remaining sets of the plurality of sets of encoded ingress data slices in the main memory 110-112.

When the instruction DSEC module 322 issues the read request 348 to the memory system module 316 for retrieval of the one or more sets of encoded instruction slices 334 and the memory system module 316 determines that the one or more sets of encoded instruction slices 334 are stored in the DSN memory 22, the memory system module 316 is further operable to issue at least one or more of sets of at least a decode threshold number of read commands 350 to the DS token module 312 regarding retrieval of the one or more sets of encoded instruction slices 334. The DS token module 312 is further operable to convert the at least one or more of sets of at least the decode threshold number of read commands 350 into at least one or more of sets of at least the decode threshold number of DSN read commands 382, issue, via the computing device 310, the at least one or more of sets of at least the decode threshold number of DSN read commands 382 to the DS units of the DSN memory 22, convert one or more sets of a least a decode threshold number of DSN encoded instruction slices 384 received from the DSN memory 22 into the one or more sets of encoded instruction slices 334, and provide the one or more sets of encoded instruction slices 334 to the memory system module 316. The memory system module 316 is further operable to provide the one or more sets of encoded instruction slices 334 to the instruction DSEC module 322.

When the instruction DSEC module 322 issues the read request 348 to the memory system module 316 for retrieval of the one or more sets of encoded instruction slices 334 and the memory system module 316 determines that the one or more sets of encoded instruction slices 334 are stored in the DSN memory 22, the memory system module 316 is further operable to issue the plurality of sets of at least a decode threshold number of read commands 354 to the DSN token module 312. The DS token module 312 is further operable to convert the plurality of sets of at least the decode threshold number of read commands 354 into a plurality of sets of at least the decode threshold number of DSN read commands 386, issue, via the computing device 310, the plurality of sets of at least the decode threshold number of DSN read commands 386 to the DS units of the DSN memory, convert a plurality of sets of a least a decode threshold number of DSN encoded instruction slices 388 received from the DSN memory 22 into a plurality sets of encoded instruction slices 390, and provide the plurality of sets of encoded instruction slices 390 to the memory system module 316. The memory system module 316 is further operable to provide the one or more sets of encoded instruction slices 334 of the plurality of sets of encoded instruction slices 390 to the instruction DSEC module 322 and coordinate storage of remaining sets of the plurality of sets of encoded instruction slices 390 in the main memory 110-112.

Figure 11B:
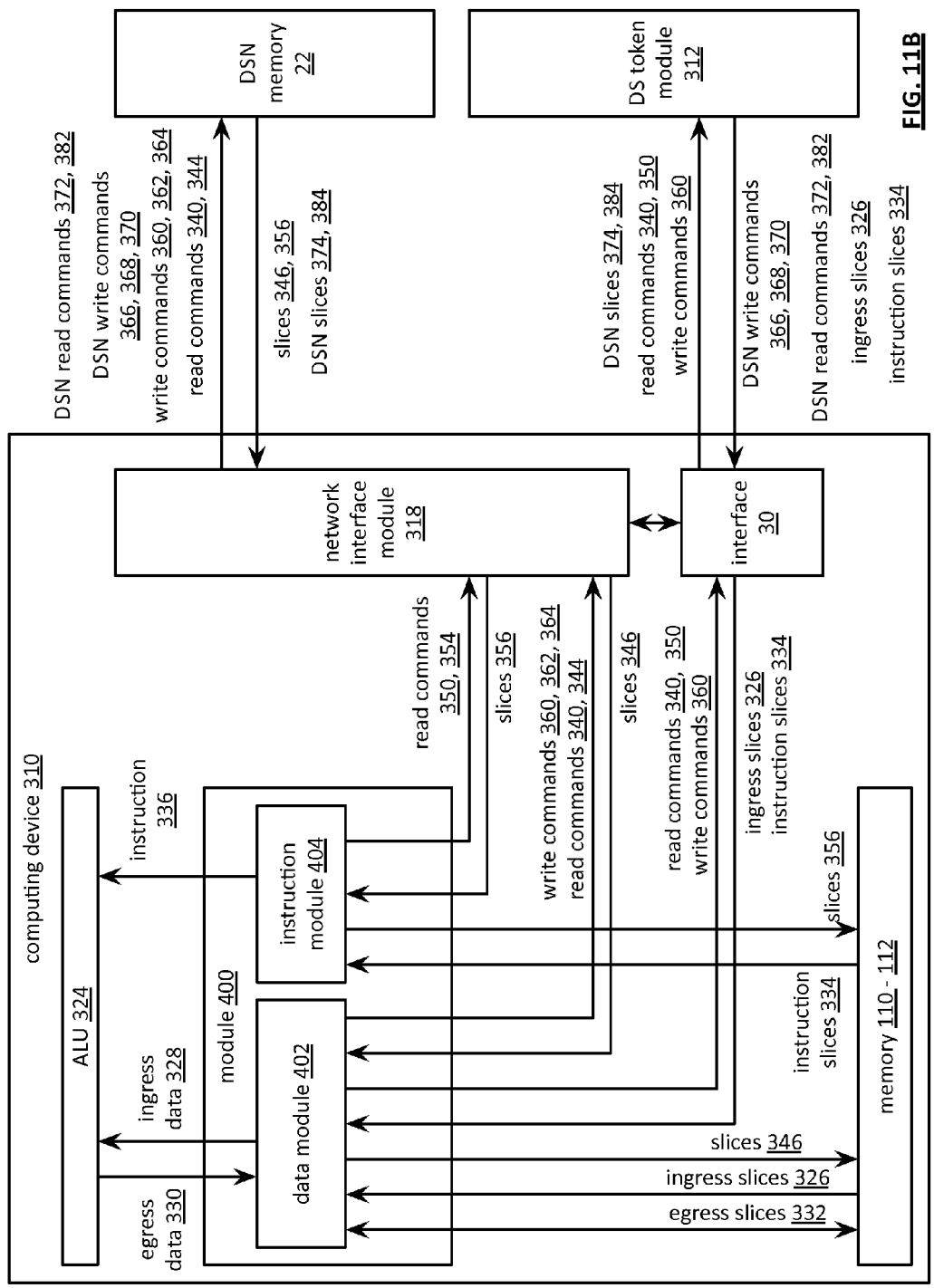
FIG. 11B is a schematic block diagram of another embodiment of a computing system in accordance with the present invention.

FIG. 11B is a schematic block diagram of another embodiment of a computing system that includes a computing device 310, a dispersed storage (DS) token module 312, and a dispersed storage network (DSN) memory 22. The computing device 310 includes memory 110-112, an interface 30 for interfacing with the token module 312, a network interface module 318 for interfacing with the DSN memory 22, an arithmetic logic unit (ALU) 324, and a module 400. The module 400 includes a data module 402 and an instruction module 404. The data module 402 is operable to coordinate retrieval of one or more sets of encoded ingress data slices 326 from memory (e.g., the memory 110-112, the DSN memory 22), decode the one or more sets of encoded ingress data slices 326 in accordance with data dispersed storage error coding (DSEC) parameters to recapture ingress data 328, encode egress data 330 in accordance with the DSEC parameters to produce one or more sets of encoded egress data slices 332, and coordinate storage of the one or more sets of encoded egress data slices 332 in the memory. The DSEC parameters include ingress data DSEC parameters, egress data DSEC parameters, and instruction DSEC parameters. The instruction module 404 is operable to coordinate retrieval of one or more sets of encoded instruction slices 334 from the memory and decode the one or more sets of encoded instruction slices 334 in accordance with the DSEC parameters to recapture an instruction 336, wherein, the data module 402 is further operable to provide the ingress data 328 to the ALU 324, the instruction module 404 is further operable to provide the instruction 336 to the ALU 324, and the data module 402 is further operable to receive the egress data 330 from the ALU 324.

The data module 402 is further operable to determine whether the one or more sets of encoded ingress data slices 326 are stored in main memory 110-112 of the computing device 310 or in the DSN memory 22. When the one or more sets of encoded ingress data slices 326 are stored in the DSN memory 22, the data module 402 is further operable to issue at least one or more of sets of at least a decode threshold number of read commands 340 to dispersed storage (DS) units of the DSN memory 22 regarding retrieval of the one or more sets of encoded ingress data slices 326.

The data module 402 is further operable to issue a plurality of sets of at least a decode threshold number of read commands 344 to the DS units of the DSN memory 22 regarding retrieval of a plurality of sets of encoded data slices that includes the one or more sets of encoded ingress data slices 326. The data module 402 is further operable to coordinate storage of a plurality of sets of a least a decode threshold number of encoded data slices 346 received from the DSN memory 22 in the main memory 110-112, wherein the plurality of sets of the at least the decode threshold number of encoded data slices 346 includes the one or more sets of encoded ingress data slices 326.

The instruction module 404 is further operable to determine whether the one or more sets of encoded instruction slices 334 are stored in main memory 110-112 of the computing device 310 or in the DSN memory 22. When the one or more sets of encoded instruction slices 334 are stored in the DSN memory 22, the instruction module 404 is further operable to issue at least one or more of sets of at least a decode threshold number of read commands 350 to the DS units of the DSN memory 22 regarding retrieval of the one or more sets of encoded instruction slices 334. The instruction module 404 is further operable to issue a plurality of sets of at least a decode threshold number of read commands 354 to the DS units of the DSN memory 22 regarding retrieval of a plurality of sets of encoded instruction slices that includes the one or more sets of encoded instruction slices 334. The instruction module 404 is further operable to coordinate storage of a plurality of sets of a least a decode threshold number of encoded instruction slices 356 received from the DSN memory 22 in the main memory 110-112, wherein the plurality of sets of a least a decode threshold number of encoded instruction slices 356 includes the one or more sets of encoded instruction slices 334.

The data module 402 is further operable to coordinate storage of the one or more sets of encoded egress data slices 332 in main memory 110-112 of the computing device 320 and determine when to transfer the one or more sets of encoded egress data slices 332 from the main memory 110-112 to the DSN memory 22. When the one or more sets of encoded egress data slices 332 is to be transferred from the main memory 110-112 to the DSN memory 22, the data module 402 is further operable to issue one or more sets of at least a write threshold number of write commands 360 to the DS units of the DSN memory 22 regarding the one or more sets of encoded egress data slices 332, issue one or more sets of at least the write threshold number of write commit commands 362 to the DS units when at least a write threshold number of DS units have confirmed respective ones of the one or more sets of at least the write threshold number of write commands 360, and issue one or more sets of at least the write threshold number of write finalize commands 364 to the DS units when at least a write threshold number of DS units have confirmed respective ones of the one or more sets of at least the write threshold number of write commit commands 362.

The data module 402 is further operable to determine when to transfer the one or more sets of encoded egress data slices 332 from the main memory 110-112 to the DSN memory 22 and when the one or more sets of encoded egress data slices is to be transferred from the main memory 110-112 to the DSN memory 22, issue one or more sets of at least a write threshold number of write commands 360 to the DS token module 312 (e.g., via interface 30). The DS token module 312 is operable to convert the one or more sets of at least a write threshold number of write commands 360 into one or more sets of at least the write threshold number of DSN write commands 366, issue the one or more sets of at least the write threshold number of DSN write commands 366 to the DS units of the DSN memory 22, issue one or more sets of at least the write threshold number of DSN write commit commands 368 to the DS units when at least a write threshold number of DS units have confirmed respective ones of the one or more sets of at least the write threshold number of DSN write commands 366, and issue one or more sets of at least the write threshold number of DSN write finalize commands 370 to the DS units when at least a write threshold number of DS units have confirmed respective ones of the one or more sets of at least the write threshold number of DSN write commit commands 368.

The data module 402 is further operable to determine whether the one or more sets of encoded ingress data slices 326 are stored in main memory 110-112 of the computing device 310 or in the DSN memory 22 and when the one or more sets of encoded ingress data slices 326 are stored in the DSN memory 22, the data module 402 is further operable to issue the at least one or more of sets of at least a decode threshold number of read commands 340 to the DS token module 312 regarding retrieval of the one or more sets of encoded ingress data slices 326. The DS token module 312 is further operable to convert the at least one or more of sets of at least the decode threshold number of read commands 340 into at least one or more of sets of at least the decode threshold number of DSN read commands 372, issue, via the computing device 310, the at least one or more of sets of at least the decode threshold number of DSN read commands 372 to the DS units of the DSN memory 22, convert one or more sets of a least a decode threshold number of DSN encoded data slices 374 received from the DSN memory 22 into the one or more sets of encoded ingress data slices 326, and provide the one or more sets of encoded ingress data slices 326 to the data module 402.

The instruction module 404 is further operable to determine whether the one or more sets of encoded instruction slices 334 are stored in the main memory 110-112 of the computing device 310 or in the DSN memory and when the one or more sets of encoded instruction slices 334 are stored in the DSN memory 22, the instruction module 404 is further operable to issue the at least one or more of sets of at least a decode threshold number of read commands 350 to the DS token module 312 regarding retrieval of the one or more sets of encoded instruction slices 334. The DS token module 312 is further operable to convert the at least one or more of sets of at least the decode threshold number of read commands 350 into at least one or more of sets of at least the decode threshold number of DSN read commands 382, issue, via the computing device 310, the at least one or more of sets of at least the decode threshold number of DSN read commands 382 to the DS units of the DSN memory 22, convert one or more sets of a least a decode threshold number of DSN encoded instruction slices 384 received from the DSN memory 22 into the one or more sets of encoded instruction slices 334 and provide the one or more sets of encoded instruction slices 334 to the instruction module 404.

FIG. 11C is a flowchart illustrating another example of transferring data. The method begins with step 410 where a processing module (e.g., of a user device) retrieves a first plurality of sets of encoded data slices from a dispersed storage network (DSN) memory in accordance with DSN access information. The first plurality of sets of encoded data slices were previously produced by dispersed storage error encoding data utilizing a first set of dispersed storage error coding parameters.

The method continues at step 412 where the processing module obtains the first set of error coding parameters from a DSN access token. The obtaining includes at least one of sending a first set of error coding parameters request to the DSN access token and receiving the first set of error coding parameters in response and retrieving the first set of error coding parameters from the DSN access token utilizing a secure token module access address associated with the DSN access token.

The method continues at step 414 where the processing module dispersed storage error decodes the first plurality of sets of encoded data slices utilizing the first set of error coding parameters to produce data. The method continues at step 416 where the processing module obtains a second set of error coding parameters from the DSN access token. The obtaining includes a DSN access token query including sending a second set of error coding parameters request to the DSN access token and receiving the second set of error coding parameters from the DSN access token.

The method continues at step 418 where the processing module dispersed storage error encodes the data utilizing the second set of error coding parameters to produce a second plurality of sets of encoded data slices. The method continues at step 420 where the processing module stores the second plurality of sets of encoded data slices in a memory associated with the user device. For example, the processing module stores the second plurality of sets of encoded data slices in a local memory of the user device. A method to retrieve the data as the second plurality of sets of encoded data slices and store the data as the first plurality of sets of encoded data slices in the DSN memory is described with reference to FIG. 11D.

FIG. 11D is a flowchart illustrating another example of transferring data, which includes similar steps to FIG. 11C. The method begins at step 422 where a processing module (e.g., of a user device) retrieves a second plurality of sets of encoded data slices from a memory associated with a user device. For example, the processing module retrieves the second plurality of sets of encoded data slices from a local memory associated with the user device. The method continues with step 416 of FIG. 11A where the processing module obtains a second set of error coding parameters from a dispersed storage network (DSN) access token and continues with step 424 where the processing module dispersed storage error decodes the second plurality of sets of encoded data slices utilizing the second set of error coding parameters to produce data.

The method continues with step 412 of FIG. 11C where the processing module obtains a first set of error coding parameters from the DSN access token and continues at step 426 where the processing module dispersed storage error encodes the data utilizing the first error coding parameters to produce a first plurality of sets of encoded data slices. The method continues at step 430 where the processing module sends the first plurality of sets of encoded data slices to a DSN memory in accordance with DSN access information for storage therein.

FIG. 12A is a flowchart illustrating another example of storing data, which includes similar steps to FIG. 8. The method begins with step 216 of FIG. 8 where a processing module (e.g., of a user device) retrieves secure token information from a dispersed storage network (DSN) access token and continues at step 432 where the processing module extracts security information from the secure token information. The security information may include one or more of an encryption algorithm identifier (ID), encryption algorithm software, an encryption key, a security requirement, a data segment ID of a data segment to encrypt, and an access credential.

The method continues at step 434 where the processing module segments data in accordance with dispersed storage error coding parameters to produce a plurality of data segments. The processing module may obtain the dispersed storage error coding parameters based on at least one of extracting the dispersed storage error coding parameters from the secure token information and retrieving the dispersed storage error coding parameters from a user device memory. For example, the processing module segments a 1 MB data file into ten 100 kB data segments to produce the plurality of data segments when the dispersed storage error coding parameters include an indicator to create 100 kB data segments.

The method continues at step 436 where the processing module encrypts at least one data segment of the plurality of data segments in accordance with the security information to produce at least one encrypted data segment. For example, the processing module encrypts a first data segment of the plurality of data segments utilizing an encryption key of the security information to produce the at least one encrypted data segment when the data segment ID of the data segment to encrypt corresponds to the first data segment.

The method continues at step 438 where the processing module dispersed storage error encodes the at least one encrypted data segment and remaining data segments of the plurality of data segments in accordance with the dispersed storage error coding parameters to produce a plurality of sets of encoded data slices. For example, the processing module dispersed storage error encodes a first encrypted data segment to produce a first set of encoded data slices and dispersed storage error encodes the remaining data segments of the plurality of data segments to produce the plurality of sets of encoded data slices when a first data segment is the first encrypted data segment. The method continues at step 440 where the processing module sends the plurality of sets of encoded data slices to a DSN memory for storage therein.

FIG. 12B is a flowchart illustrating another example of retrieving data, which includes similar steps to FIGS. 8 and 12A. The method begins with step 216 of FIG. 8 where a processing module (e.g., of a user device) retrieves secure token information from a dispersed storage network (DSN) access token and continues with step 432 of FIG. 12A where the processing module extracts security information from the secure token information. The method continues at step 442 where the processing module retrieves a plurality of sets of encoded data slices from a DSN memory in accordance with dispersed storage error coding parameters (e.g. extracted from the secure token information or retrieved from a local memory).

The method continues at step 444 where the processing module dispersed storage error decodes the plurality of sets of encoded data slices in accordance with the dispersed storage error coding parameters to produce a plurality of data segments including at least one encrypted data segment. The method continues at step 446 where the processing module decrypts the at least one encrypted data segment in accordance with the security information to produce at least one unencrypted data segment. For example, the processing module decrypts a second data segment of the plurality of data segments utilizing an encryption key of the security information to produce the at least one unencrypted data segment when a data segment identifier (ID) of a data segment to decrypt (e.g., the data segment ID extracted from the security information) corresponds to the second data segment. The method continues at step 448 where the processing module aggregates the at least one unencrypted data segment with remaining data segments of the plurality of data segments to produce data. The aggregation excludes the at least one encrypted data segment (e.g., in encrypted form).

Figure 13:
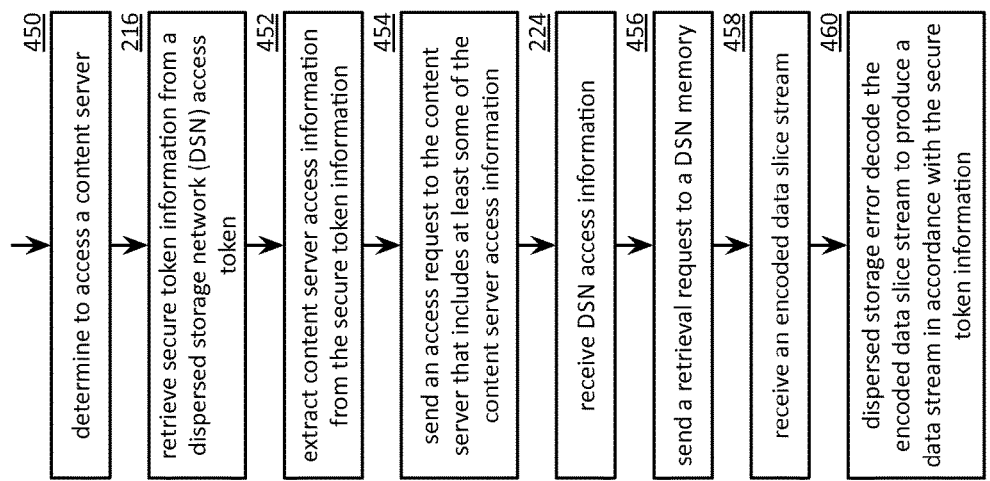
FIG. 13 is a flowchart illustrating an example of retrieving a data stream in accordance with the present invention.

FIG. 13 is a flowchart illustrating an example of retrieving a data stream, which includes similar steps to FIG. 8. The method begins at step 450 where a processing module (e.g., of a user device) determines to access a content server. The determination may be based on one or more of a directory lookup, a message, a query, a list, a link, and identifying a content identifier (ID) associated with desired content. For example, a user device determines to access a video clip of a network news broadcast associated with a content ID of 320 based on a broadcast directory lookup, wherein the video clip is stored in the content server. The method continues with step 216 of FIG. 8 where the processing module retrieves secure token information from a dispersed storage network (DSN) access token and continues at step 452 where the processing module extracts content server access information from the secure token information. The content server access information may include one or more of a content server address, an access credential, an encryption key, and a password.

The method continues at step 454 where the processing module sends an access request to the content server, wherein the access request includes at least some of the content server access information. For example, the processing module sends the access request to the content server utilizing the content server address, wherein the access request includes a user ID, a content ID, the access credential, and the password. The method continues with step 224 of FIG. 8 where the processing module receives DSN access information (e.g., from the content server, from a DSN access server), wherein such DSN access information includes access information associated with accessing a stream of plurality of sets of encoded data slices associated with the content ID.

The method continues at step 456 where the processing module sends a retrieval request to a DSN memory, wherein the request includes at least some of the DSN access information (e.g., a DSN access address corresponding to the plurality of sets of encoded data slices associated with the content ID). The method continues at step 458 where the processing module receives an encoded data slice stream, wherein the encoded data slice stream is associated with desired content. For example, the encoded data slice stream includes a plurality of sets of encoded data slices produced from dispersed storage error encoding a video stream of the desired content. The method continues at step 460 where the processing module dispersed storage error decodes the encoded data slice stream to produce a data stream in accordance with the secure token information. For example, the processing module dispersed storage error decodes the encoded data slice stream utilizing dispersed storage error coding parameters of the secure token information to produce the data stream.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for data transfer from a first computing device to a second computing device using a dispersed storage network (DSN) transfer token module comprises:
    retaining security information and a dispersed storage error encoding function within the dispersed storage network (DSN) transfer token module, wherein the security information includes one or more of: an encryption algorithm identifier (ID), encryption algorithm software, an encryption key, a security requirement, a data segment ID of a data segment to encrypt, or an access credential and wherein the dispersed storage error encoding function includes a pillar width and decode threshold combination, where the pillar width reflects a number of distinct dispersed storage (DS) units;
    when the first computing device is paired with the DSN transfer token module, wherein being paired requires connectivity and substantially close physical proximity:
        sending, by the first computing device, the data to the DSN transfer token module;
        encoding, by the DSN transfer token module, the data utilizing the security information and dispersed storage error encoding function to produce one or more sets of encoded data slices, wherein a decode threshold number of encoded data slices of a set of the one or more sets of encoded data slices is required to recover a data segment of the data, wherein the decode threshold number is less than the pillar width number of encoded data slices within the set of the one or more sets of encoded data slices; and
        sending, by the DSN transfer token module via the first computing device, the one or more sets of encoded data slices to a target destination; and
    when the second computing device is paired with the DSN transfer token module:
        retrieving, by the DSN transfer token module via the second computing device, the one or more sets of encoded data slices from the target destination;
        decoding, by the DSN transfer token module, the one or more sets of encoded data slices utilizing the security information and the dispersed storage error encoding function to recapture the data; and
        storing, by the second computing device, the data.

2. The method of claim 1, wherein the dispersed storage error encoding function comprises:
    a set of dispersed storage error encoding parameters, including the pillar width and decode threshold combination, which are unique to the DSN transfer token module.

3. The method of claim 1, wherein the target destination comprises one or more of:
    the second computing device;
    the first computing device;
    dispersed storage network (DSN) memory;
    a server;
    a third computing device; and
    network memory.

4. The method of claim 1 further comprises:
    sending the one or more sets of encoded data slices to the target destination via a network; and
    retrieving the one or more sets of encoded data slices from the target destination via the network.

5. The method of claim 1, wherein the sending the data to the DSN transfer token module further comprises:
    sending, by the DSN transfer token module, a graphic user interface (GUI) regarding the data transfer;
    receiving, by the first computing device, a response to the GUI regarding the data transfer; and
    in accordance with the response, sending, by the first computing device, the data to the DSN transfer token module.

6. The method of claim 1, wherein the sending the data to the DSN transfer token module further comprises:
    generating, by the first computing device, a transfer request that includes the data.

7. The method of claim 1, wherein the sending the one or more sets of encoded data slices to the target destination further comprises:
    generating, by the DSN transfer token module, transfer information regarding transferring the data to the second computing device; and
    storing, by the DSN transfer token module, the transfer information in memory of the DSN transfer token module.

8. The method of claim 7, wherein the retrieving of the one or more sets of encoded data slices further comprises:

generating, by the second computing device, a transfer completion request that includes transfer completion information;
sending, by the second computing device, the transfer completion request to the DSN transfer token module;
retrieving, by the DSN transfer token module, the transfer information from the memory of the DSN transfer token module based on the transfer completion information;
generating, by the DSN transfer token module, one or more sets of at least a threshold number of data slice read requests based on the transfer information; and
sending, by the DSN transfer token module via the second computing device, the one or more sets of the at least the threshold number of data slice read requests to the target destination.

9. The method of claim 7 further comprises at least one of:
when the data is stored by the second computing device:
deleting, by the DSN transfer token module, the transfer information; and
facilitating, by the DSN transfer token module, deletion of the one or more sets of encoded data slices from the target destination.

10. A dispersed storage network (DSN) transfer token module comprises:
an interface module for interfacing with a first computing device and a second computing device;
memory, wherein security information and a dispersed storage error encoding function are stored within the memory, wherein the security information includes one or more of: an encryption algorithm identifier (ID), encryption algorithm software, an encryption key, a security requirement, a data segment ID of a data segment to encrypt, or an access credential and wherein the dispersed storage error encoding function includes a pillar width and decode threshold combination, where the pillar width reflects a number of distinct dispersed storage (DS) units;
a processing module operably coupled to the memory and operable to, when the DSN transfer token module is paired with the first computing device, wherein being paired requires connectivity and substantially close physical proximity:
receive data from the first computing device;
encode the data utilizing the dispersed storage error encoding function to produce one or more sets of encoded data slices, wherein a decode threshold number of encoded data slices of the pillar width set of the one or more sets of encoded data slices is required to recover a data segment of the data, wherein the decode threshold number is less than a number of encoded data slices within the set of the one or more sets of encoded data slices; and
send, via the first computing device, the one or more sets of encoded data slices to a target destination; and
the processing module is further operable to, when the DSN transfer token module is paired with the second computing device:
retrieve, via the second computing device, the one or more sets of encoded data slices from the target destination;
decode the one or more sets of encoded data slices utilizing the dispersed storage error encoding function to recapture the data; and
send the data to the second computing device for storage by the second computing device.

11. The DSN transfer token module of claim 10, wherein the interface module comprises at least one of:
a universal serial bus (USB) interface module;
a Bluetooth interface module;
a fire-wire interface module;
a 60GHz wireless transceiver; and
a Wi-Fi interface module.

12. The DSN transfer token module of claim 10, wherein the dispersed storage error encoding function comprises:
a set of dispersed storage error encoding parameters, including the pillar width and decode threshold combination, which are unique to the DSN transfer token module.

13. The transfer token module of claim 10, wherein the target destination comprises one or more of:
the second computing device;
the first computing device;
dispersed storage network (DSN) memory;
a server;
a third computing device; and
network memory.

14. The DSN transfer token module of claim 10, wherein the processing module is further operable to:
send the one or more sets of encoded data slices to the target destination via a network when the DSN transfer token module is paired with the first computing device; and
retrieve the one or more sets of encoded data slices from the target destination via the network when the DSN transfer token module is paired with the second computing device.

15. The DSN transfer token module of claim 10, wherein the processing module functions to receive data from the first computing device by:
sending a graphic user interface (GUI) regarding a data transfer; and
receiving the data from the first computing device in accordance with a response to the GUI received by the first computing device.

16. The DSN transfer token module of claim 10, wherein the processing module further functions to receive data from the first computing device by:
receiving a transfer request that includes the data from the first computing device.

17. The DSN transfer token module of claim 10, wherein the processing module functions to send the one or more sets of encoded data slices to the target destination by:
generating transfer information regarding transferring the data to the second computing device; and
storing the transfer information in memory of the DSN transfer token module.

18. The DSN transfer token module of claim 17, wherein the processing module further functions to retrieve the one or more sets of encoded data slices by:
receiving a transfer completion request that includes transfer completion information from the second computing device;
retrieving the transfer information from the memory of the DSN transfer token module based on the transfer completion information;
generating one or more sets of at least a threshold number of data slice read requests based on the transfer information; and
sending, via the second computing device, the one or more sets of the at least the threshold number of data slice read requests to the target destination.

19. The DSN transfer token module of claim 17, wherein the processing module is further operable to:
when the data is stored by the second computing device:
delete the transfer information; and
facilitate deletion of the one or more sets of encoded data slices from the target destination.

20. A module for enabling a first computing device to transfer data from the first computing device to a second computing device using a dispersed storage network (DSN) transfer token module when the first computing device is paired with the DSN transfer token module, wherein being paired requires connectivity and substantially close physical proximity, the module comprises:
a first module that, when operable within the first computing device, causes the first computing device to send the data to the DSN transfer token module, wherein the DSN transfer token module retains security information and a dispersed storage error encoding function, wherein the security information includes one or more of: an encryption algorithm identifier (ID), encryption algorithm software, an encryption key, a security requirement, a data segment ID of a data segment to encrypt, or an access credential and wherein the dispersed storage error encoding function includes a pillar width and decode threshold combination, where the pillar width reflects a number of distinct dispersed storage (DS) units;
a second module that, when operable within the first computing device, causes the first computing device to receive one or more sets of encoded data slices from the DSN transfer token module, wherein the DSN transfer token module encodes the data utilizing the dispersed storage error encoding function to produce the one or more sets of encoded data slices, wherein a decode threshold number of encoded data slices of a set of the one or more sets of encoded data slices is required to recover a data segment of the data, wherein the decode threshold number is less than the pillar width number of encoded data slices within the set of the one or more sets of encoded data slices; and
a third module that, when operable within the first computing device, causes the first computing device to send the one or more sets of encoded data slices to a target destination.

21. The module of claim 20, wherein the target destination comprises one or more of:
the second computing device;
the first computing device;
dispersed storage network (DSN) memory;
a server;
a third computing device; and
network memory.

22. The module of claim 20, wherein the third module functions to send the one or more sets of encoded data slices to the target destination by:
sending the one or more sets of encoded data slices to the target destination via a network.

23. The module of claim 20, wherein the first module functions to send the data to the DSN transfer token module by one or more of:
receiving a graphic user interface (GUI) regarding the data transfer from the DSN transfer token module;
outputting the GUI regarding the data transfer to a first computing device user interface;
receiving a response to the GUI regarding the data transfer; and
in accordance with the response, sending the data to the DSN transfer token module.

24. The module of claim 20, wherein the first module further functions to send the data to the DSN transfer token module by:
generating a transfer request that includes the data.

25. A module for enabling a second computing device to transfer data from a first computing device to the second computing device using a dispersed storage network (DSN) transfer token module when the second computing device is paired with the DSN transfer token module, wherein being paired requires connectivity and substantially close physical proximity, the module comprises:
a first module that, when operable within the second computing device, causes the second computing device to retrieve one or more sets of encoded data slices from a target destination, wherein the data was encoded utilizing a dispersed storage error encoding function to produce the one or more sets of encoded data slices and wherein the one or more sets of encoded data slices were stored at the target destination, wherein a decode threshold number of encoded data slices of a pillar width set of the one or more sets of encoded data slices is required to recover a data segment of the data, wherein the decode threshold number is less than a number of encoded data slices within the set of the one or more sets of encoded data slices;
a second module that, when operable within the second computing device, causes the second computing device to send the one or more sets of encoded data slices to the DSN transfer token module, wherein the DSN transfer token module retains security information and the dispersed storage error encoding function, wherein the security information includes one or more of: an encryption algorithm identifier (ID), encryption algorithm software, an encryption key, a security requirement, a data segment ID of a data segment to encrypt, or an access credential and wherein the dispersed storage error encoding function includes the pillar width and decode threshold combination, where the pillar width reflects a number of distinct dispersed storage (DS) units;
a third module that, when operable within the first computing device, causes the first computing device to receive the data from the DSN transfer token module, wherein the DSN transfer token module decodes the one or more sets of encoded data slices utilizing the dispersed storage error encoding function to recapture the data; and
a fourth module that, when operable within the first computing device, causes the first computing device to store the data.

26. The module of claim 25, wherein the target destination comprises one or more of:
the second computing device;
the first computing device;
dispersed storage network (DSN) memory;
a server;
a third computing device; and
network memory.

27. The module of claim 25, wherein the first module functions to retrieve the one or more sets of encoded data slices from the target destination by:
retrieving the one or more sets of encoded data slices from the target destination via a network.

28. The module of claim 25, wherein the first module further functions to retrieve the one or more sets of encoded data slices from the target destination by:
- generating a transfer completion request that includes transfer completion information;
- sending the transfer completion request to the DSN transfer token module;
- receiving one or more sets of at least a threshold number of data slice read requests from the DSN transfer token module, wherein the one or more sets of at least the threshold number of data slice read requests are generated based on the transfer completion request;
- sending the one or more sets of at least the threshold number of data slice read requests to the target destination; and
- receiving the one or more sets of encoded data slices from the target destination.

29. The module of claim 25, wherein the fourth module functions to store the data by one or more of:
- storing the data in a local memory of the second computing device; and
- sending a storage complete indication to the DSN transfer token module when the data is successfully stored in the local memory of the second computing device.

* * * * *